US012791167B2

(12) United States Patent
Shaw et al.

(10) Patent No.: US 12,791,167 B2
(45) Date of Patent: Nov. 10, 2026

(54) SOLAR POWERED ROAD DEVICES AND ASSOCIATED SYSTEMS AND METHODS

(71) Applicant: Brightpave Markers Inc., Littleton, CO (US)

(72) Inventors: Peter Adam Shaw, Littleton, CO (US); David Wilson Reed, Austin, TX (US); Daniel Joseph Bodenstein, Boulder, CO (US); Ryan Michael Welsh Snow, Boulder, CO (US); Mikaela Marie Leeyi Juzswik, Louisville, CO (US); Sean William Connelly, Broomfield, CO (US); John Studebaker, Longmont, CO (US)

(73) Assignee: Brightpave Markers Inc., Littleton, CO (US)

( * ) Notice: Subject to any disclaimer, the term of this patent is extended or adjusted under 35 U.S.C. 154(b) by 0 days.

(21) Appl. No.: 19/065,617

(22) Filed: Feb. 27, 2025

(65) Prior Publication Data

US 2026/0016140 A1 Jan. 15, 2026

Related U.S. Application Data

(60) Provisional application No. 63/670,479, filed on Jul. 12, 2024.

(51) Int. Cl.

*F21V 15/01* (2006.01)
*F21S 8/02* (2006.01)

(Continued)

(52) U.S. Cl.

CPC .............. *F21V 15/01* (2013.01); *F21S 8/022* (2013.01); *F21S 9/03* (2013.01); *F21V 5/04* (2013.01);

(Continued)

(58) Field of Classification Search

CPC .......... F21W 2131/103; F21W 2111/02; F21V 31/005; F21V 23/0442; F21V 23/0435;

(Continued)

(56) References Cited

U.S. PATENT DOCUMENTS 6,459,218 B2 10/2002 Boys et al.
6,602,021 B1 8/2003 Kim (Continued)

FOREIGN PATENT DOCUMENTS

EP 4651627 A1 11/2025
JP H07259036 A 10/1995

(Continued)

*Primary Examiner* — Anabel Ton

(74) *Attorney, Agent, or Firm* — Cozen O'Connor

(57) ABSTRACT

An illuminated roadway device may include an outer shell fixable to a roadway. An illuminated roadway device may include an electronics component insertable into the outer shell, the electronics component comprising: a housing comprising a first housing, an second housing securable to the first housing, a power device secured within the electronics component, a solar power generation component in coupled with the power device to recharge the power device, an optic arrangement located at the housing comprising a light collimator in an internal space defined by the housing and in optical communication with a light-emitting surface at an external space of the housing, a light-emitting device aligned with the optic arrangement such that light emitted by the light-emitting device enters the light collimator. An illuminated roadway device may include an impact plate secured to the outer shell and covering at least a part of the electronics component.

60 Claims, 34 Drawing Sheets

(51) Int. Cl.

| | |
|---|---|
| ***F21S 9/03*** | (2006.01) |
| ***F21V 5/04*** | (2006.01) |
| ***F21V 7/04*** | (2006.01) |
| ***F21V 23/04*** | (2006.01) |
| ***F21V 31/00*** | (2006.01) |
| ***H02S 10/20*** | (2014.01) |
| ***H02S 20/21*** | (2014.01) |
| *F21W 111/02* | (2006.01) |
| *F21W 131/103* | (2006.01) |

(52) U.S. Cl.
CPC ............ *F21V 7/04* (2013.01); *F21V 23/0435* (2013.01); *F21V 23/0442* (2013.01); *F21V 31/005* (2013.01); *H02S 10/20* (2014.12); *H02S 20/21* (2014.12); *F21W 2111/02* (2013.01); *F21W 2131/103* (2013.01)

(58) Field of Classification Search
CPC .... F21V 7/04; F21V 5/04; F21V 15/01; F21S 9/03; F21S 8/022; H02S 20/21; H02S 10/20
See application file for complete search history.

(56) References Cited

U.S. PATENT DOCUMENTS

| | | | | |
|---|---|---|---|---|
| 6,624,845 | B2 | 9/2003 | Loyd et al. | |
| 6,633,238 | B2 | 10/2003 | Lemelson et al. | |
| 7,023,361 | B1 | 4/2006 | Wallace et al. | |
| 7,095,337 | B2 | 8/2006 | Sudou et al. | |
| 7,688,222 | B2 | 3/2010 | Peddie et al. | |
| 2002/0008973 | A1 | 1/2002 | Boys et al. | |
| 2005/0244225 | A1 | 11/2005 | Jordan | |
| 2015/0003909 | A1 | 1/2015 | Martin et al. | |
| 2017/0335526 | A1* | 11/2017 | Van Alfen | E01F 9/559 |
| 2018/0347127 | A1* | 12/2018 | Lambert | F21S 9/035 |
| 2020/0040536 | A1 | 2/2020 | Lambert | |
| 2020/0199832 | A1 | 6/2020 | Langford et al. | |

FOREIGN PATENT DOCUMENTS

| | | | | |
|---|---|---|---|---|
| KR | 200409698 | Y1 | 3/2006 | |
| KR | 100748260 | B1 | 8/2007 | |
| KR | 100981016 | B1 | 9/2010 | |
| KR | 200488416 | Y1 | 1/2019 | |
| KR | 102113334 | B1 | 5/2020 | |
| KR | 102489097 | B1 | 1/2023 | |
| KR | 102508372 | B1 | 3/2023 | |
| WO | 2001042567 | A1 | 6/2001 | |
| WO | WO-2016016604 | A1 * | 2/2016 | F21V 5/02 |

* cited by examiner

SOLAR POWERED ROAD DEVICES AND ASSOCIATED SYSTEMS AND METHODS

CROSS-REFERENCE TO RELATED APPLICATIONS

This application claims priority to and benefits from U.S. Provisional Patent Application Ser. No. 63/670,479, filed Jul. 12, 2024. The entire contents of the aforementioned application are incorporated by reference herein.

BACKGROUND

Road reflector devices are used to improve road safety. Reflective road devices such as the "cat's eye" reflect headlights at night or in low-visibility conditions. Electronic versions of the "cat's eye" utilize an internal light source to emit light instead of just reflecting from an external source, such as the headlights. Existing road reflector and lighting devices suffer from manufacturability issues, difficult installation, and durability challenges from damage by road objects such as chains, tires, plows, etc., while trying to communicate information with roadway users.

SUMMARY

In some aspects, the techniques described herein relate to an illuminated roadway device, including: an outer shell fixable to a roadway; an electronics component insertable into the outer shell, the electronics component including: a first housing, an second housing securable to the first housing, a power device secured within the electronics component, a solar power generation component coupled with the power device to recharge the power device, an optic arrangement located at the housing including a light collimator in an internal space defined by the housing and in optical communication with a light-emitting surface at an external space of the housing; a light-emitting device aligned with the optic arrangement such that light emitted by the light-emitting device enters the light collimator; and an impact plate secured to the outer shell and covering at least a part of the electronics component.

In some aspects, the techniques described herein relate to a method for installing an illuminated roadway device, including: plunging a cutting device into a roadway at desired location of the illuminated roadway device to create an installation indentation; adhering an outer shell of the illuminated roadway device into the installation indentation; installing at least one electronics component of the illuminated roadway device into an electronics aperture within an upper flat surface of the outer shell; securing an impact plate over the electronics component; and provisioning the illuminated roadway device.

In some aspects, the techniques described herein relate to a wireless roadway communication device, including: an electronics component mountable within a roadway and including: a memory storing non-transitory computer readable instructions, and a processor that, in response to executing the computer readable instructions, causes the electronics component to: receive, via a wireless control signal, provisioning data for configuring the electronics component, and output, using a light-emitting device, light according to the provisioning data.

BRIEF DESCRIPTION OF THE FIGURES

FIGS. 27-30 show features of illuminated roadway device of FIG. 1 that may be included in embodiments of illuminated roadway device.

FIG. 29 illustrates that a single outer shell may house a plurality of electronics components.

FIG. 30 shows that the electronics component may further include a retroreflective component.

DETAILED DESCRIPTION OF THE EMBODIMENTS

Regarding instances of the terms "and/or" and "at least one of," for example, in the cases of "A and/or B" and "at least one of A and B," such phrasing encompasses the selection of (i) A only, or (ii) B only, or (iii) both A and B. In the cases of "A, B, and/or C" and "at least one of A, B, and C," such phrasing encompasses the selection of (i) A only, or (ii) B only, or (iii) C only, or (iv) A and B only, or (v) A and C only, or (vi) B and C only, or (vii) each of A and B and C. This may be extended for as many items as are listed.

Figure 1:
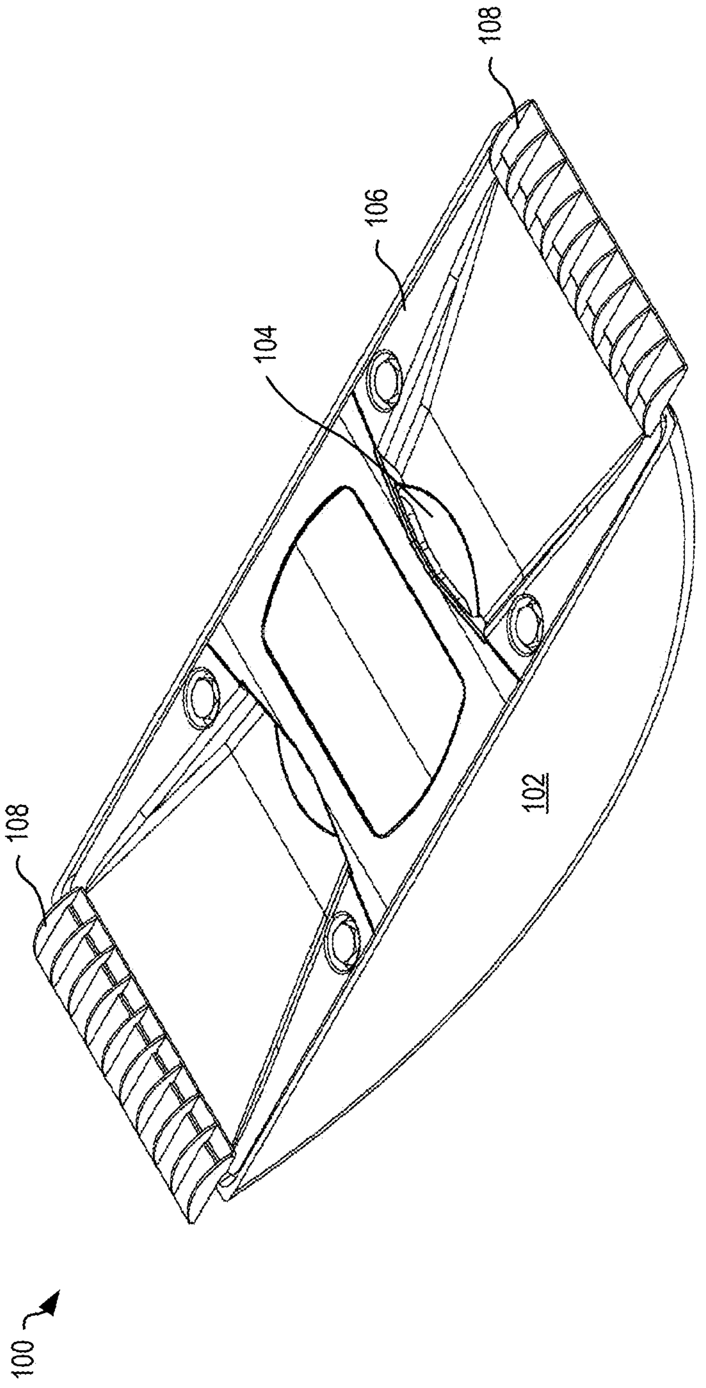
FIG. 1 shows a front top perspective view of an illuminated roadway device, in an embodiment.
Figure 2:
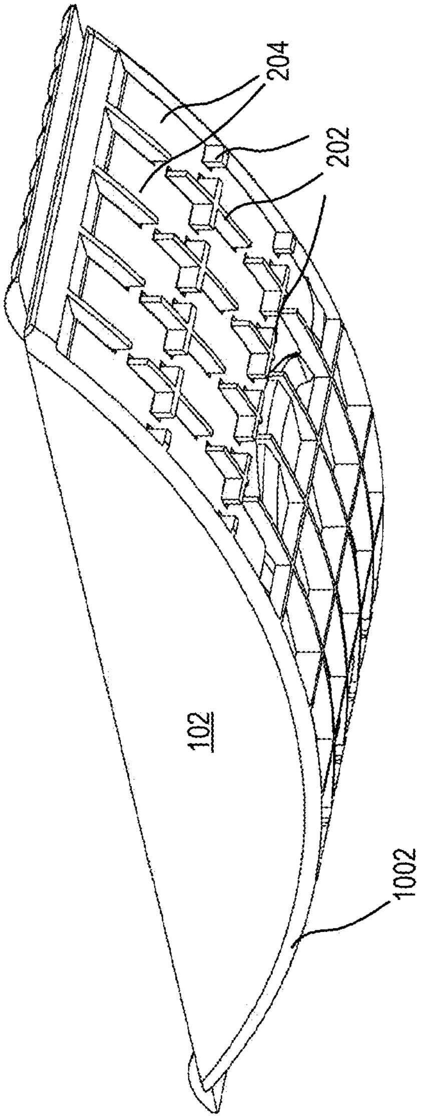
FIG. 2 shows a front bottom perspective view of the illuminated roadway device of FIG. 1.
Figure 3:
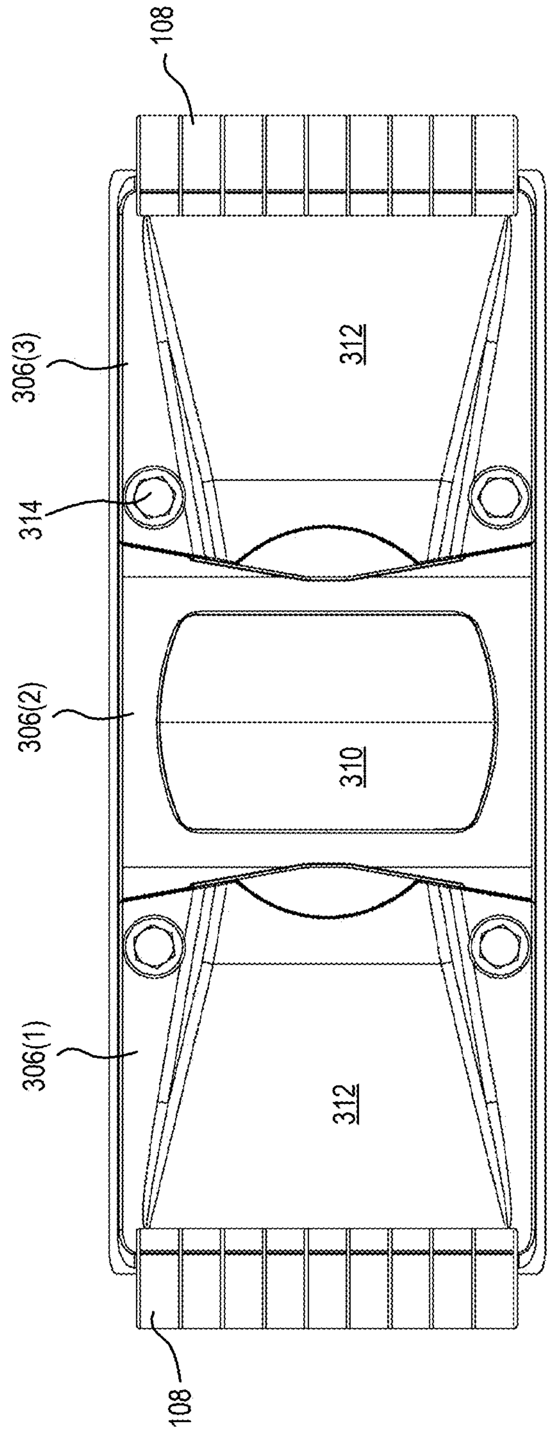
FIG. 3 shows a top plan view of the illuminated roadway device of FIG. 1.
Figure 4:
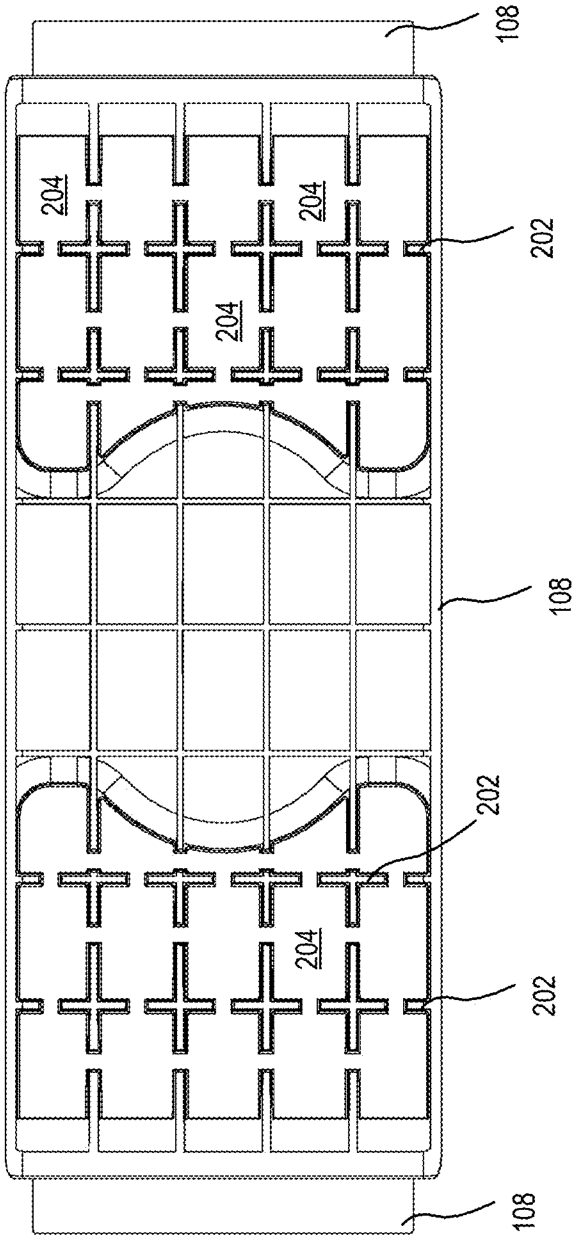
FIG. 4 shows a bottom plan view of the illuminated roadway device of FIG. 1.
Figure 5:
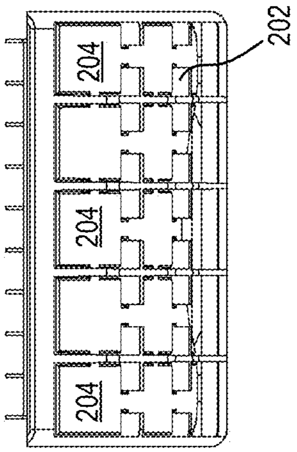
FIG. 5 shows a right elevation view of the illuminated roadway device of FIG. 1, with the left elevation being a mirror image of FIG. 5.
Figure 6:
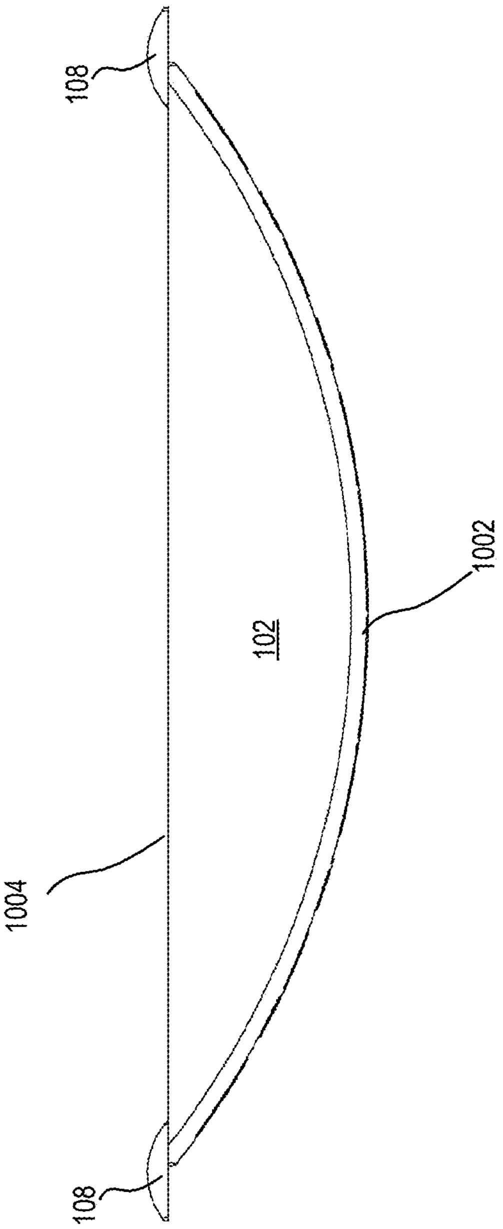
FIG. 6 shows a front elevation view of the illuminated roadway device of FIG. 1, with the rear elevation being a mirror image of FIG. 6.
Figure 7:
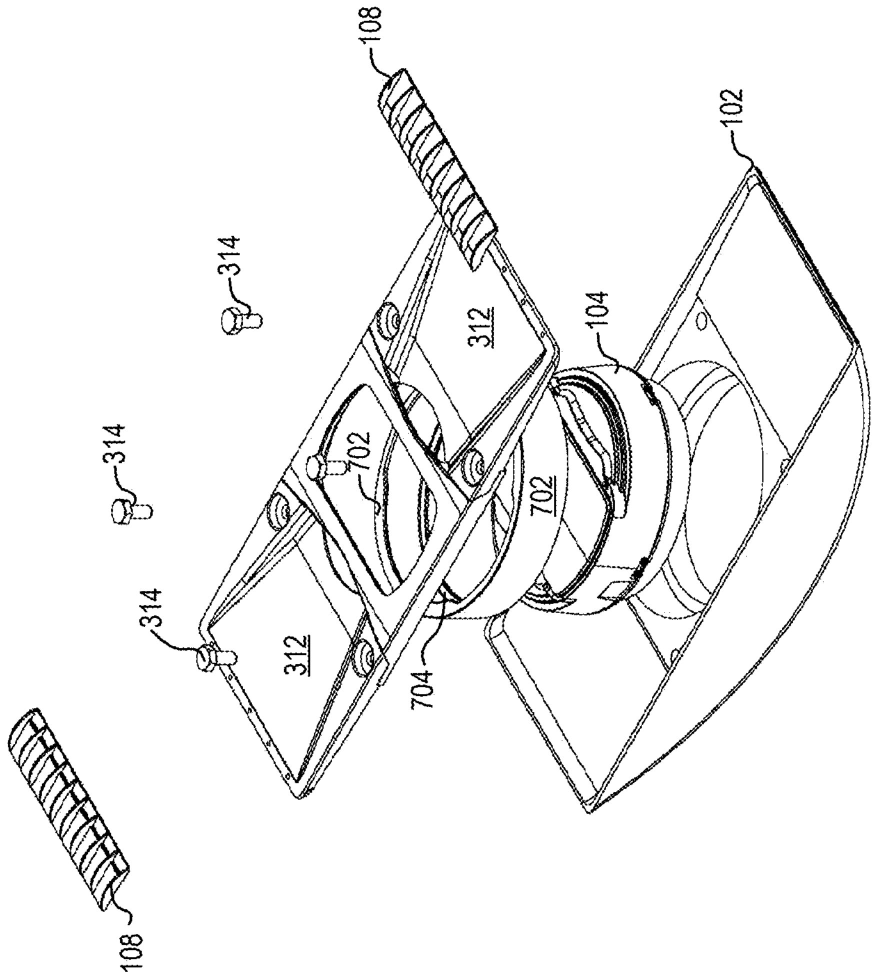
FIG. 7 shows an exploded perspective view of the illuminated roadway device of FIG. 1.
Figure 8:
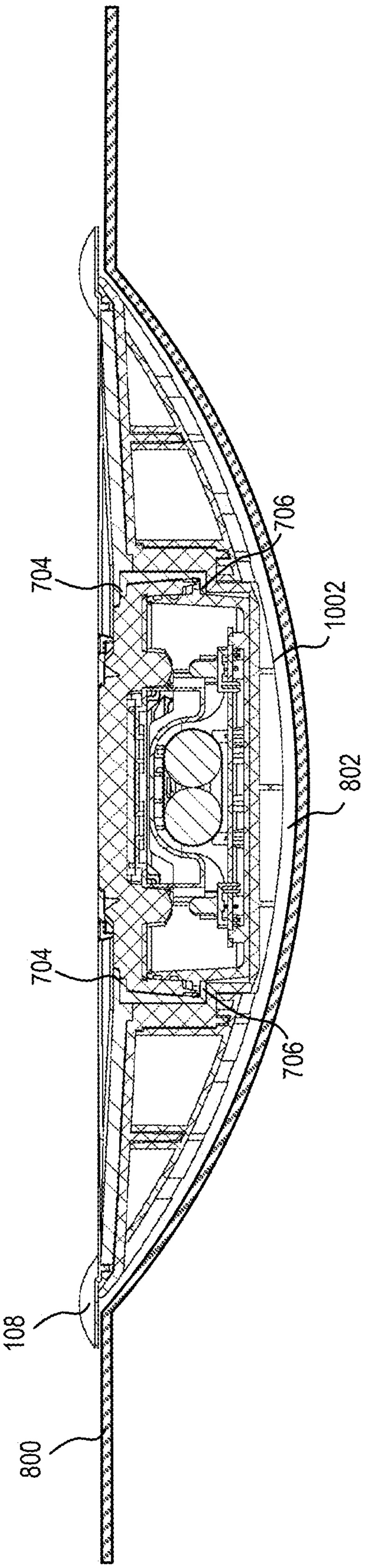
FIG. 8 shows a middle sectional view along a longitudinal axis of the illuminated roadway device of FIG. 1.
Figure 9:
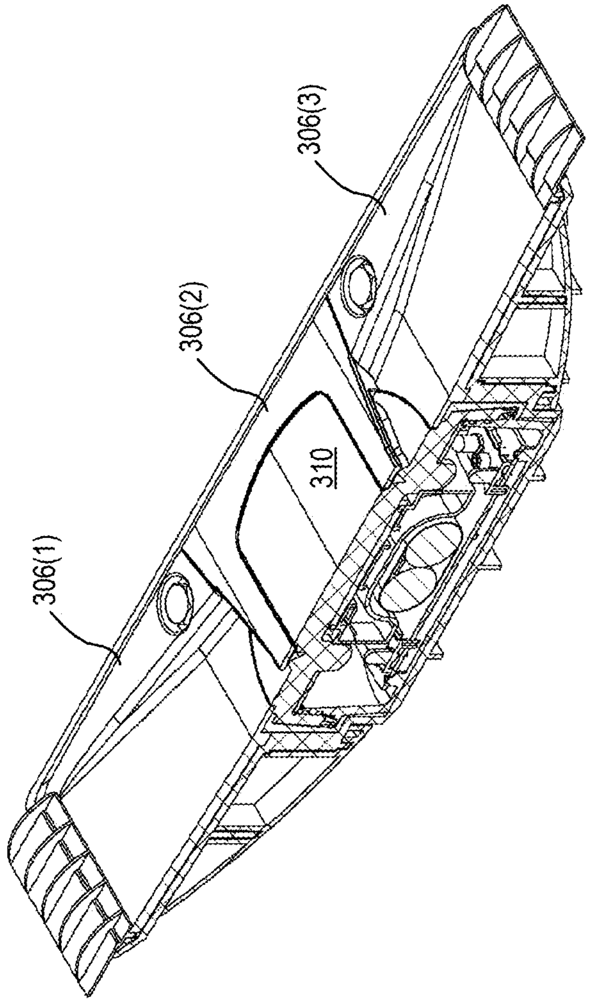
FIG. 9 shows a perspective sectional view along the longitudinal axis of the illuminated roadway device of FIG. 1.
Figure 10:
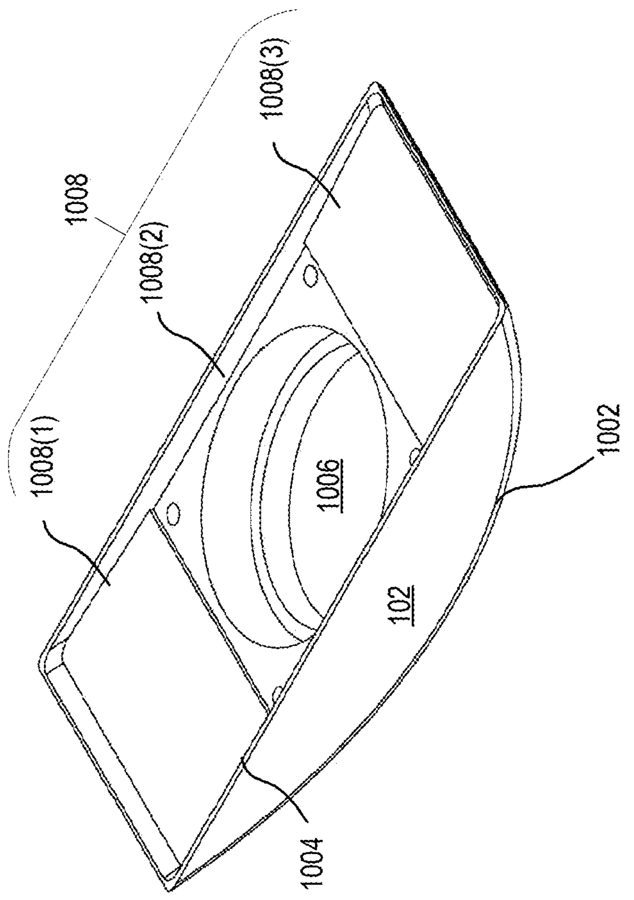
FIG. 10 shows a front top perspective view of the outer shell of the illuminated roadway device of FIG. 1.
Figure 11:
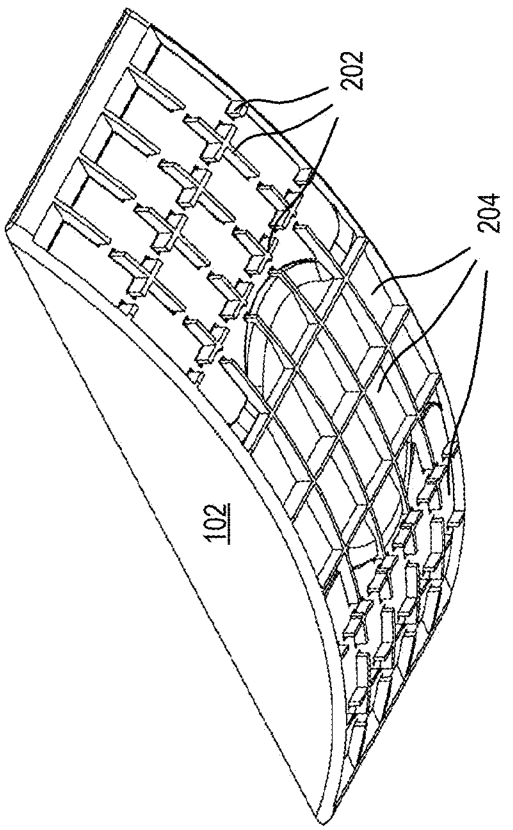
FIG. 11 shows a front bottom perspective view of the outer shell of the illuminated roadway device of FIG. 1.
Figure 12:
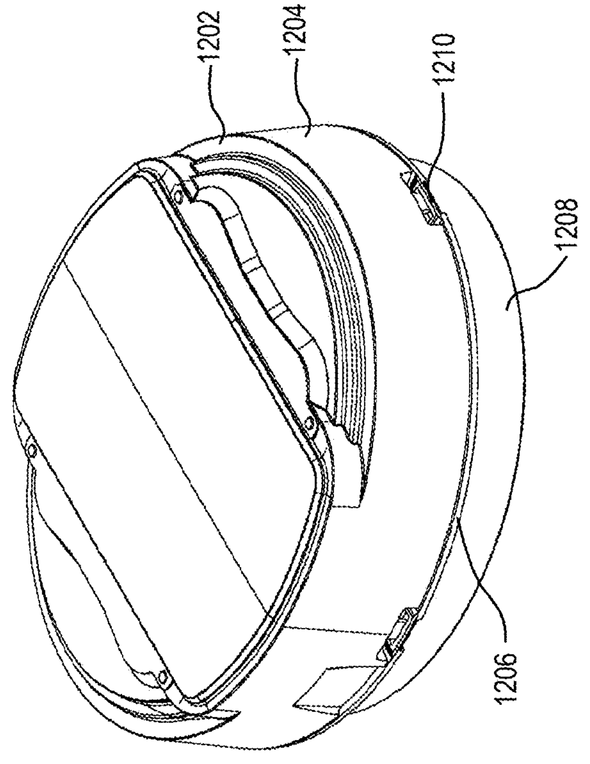
FIG. 12 shows a front top perspective view of the electronics component of the illuminated roadway device of FIG. 1.
Figure 13:
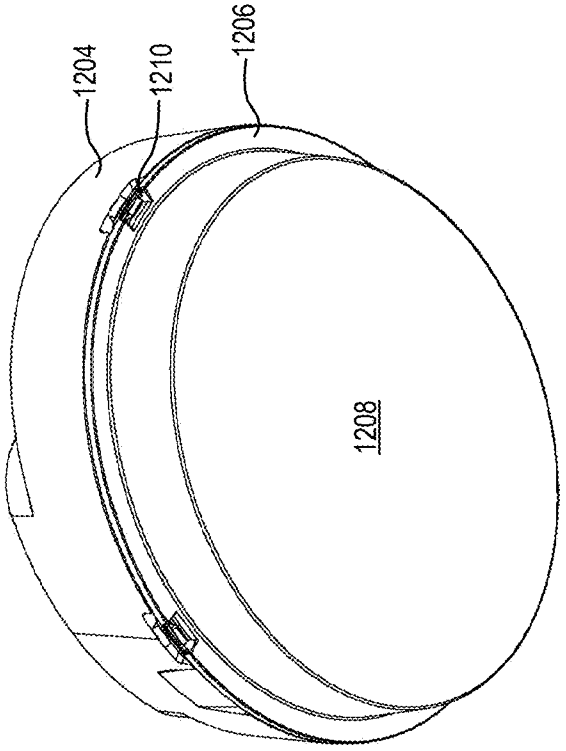
FIG. 13 shows a front bottom perspective view of the electronics component of the illuminated roadway device of FIG. 1.
Figure 14:
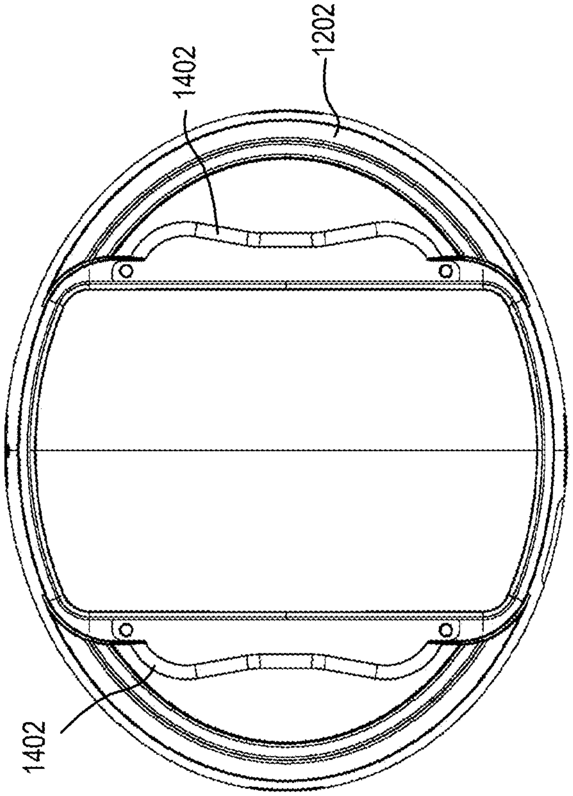
FIG. 14 shows a top plan view of the electronics component of the illuminated roadway device of FIG. 1.
Figure 15:
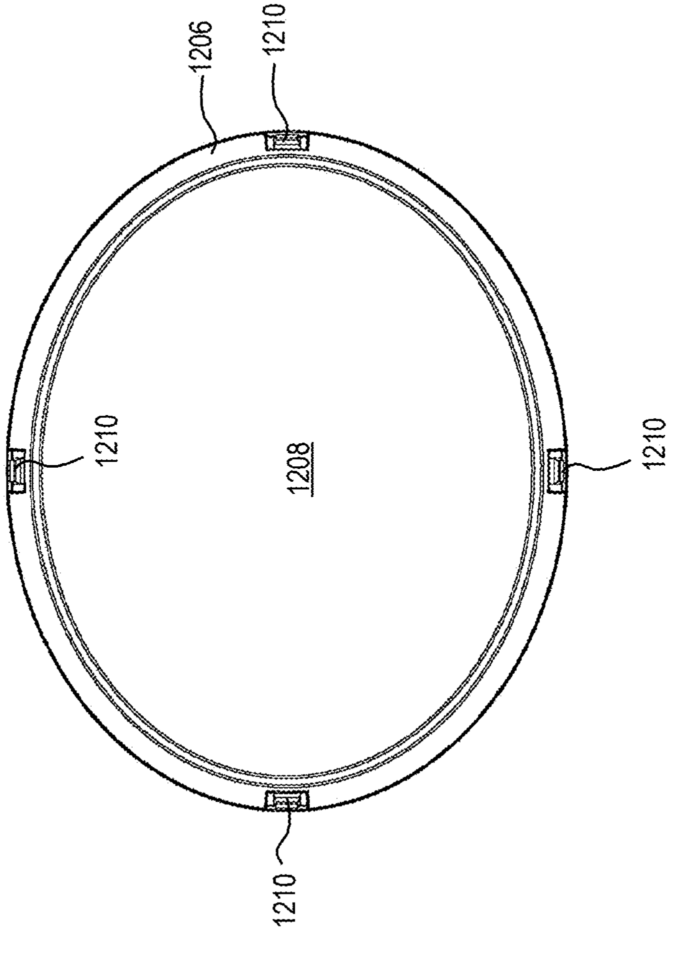
FIG. 15 shows a bottom plan view of the electronics component of the illuminated roadway device of FIG. 1.
Figure 16:
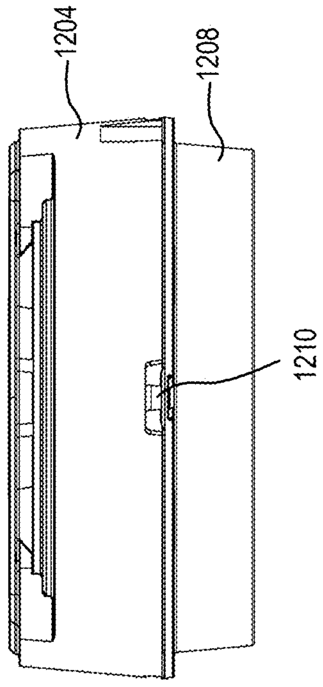
FIG. 16 shows a right elevation view of the electronics component of the illuminated roadway device, with the left elevation being a mirror image of FIG. 16.
Figure 17:
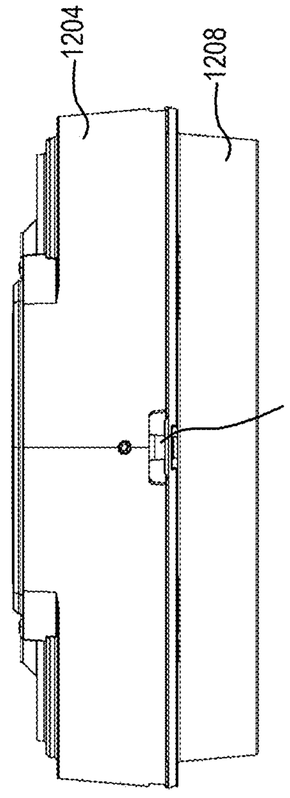
FIG. 17 shows a front elevation view of the electronics component of the illuminated roadway device, with the rear elevation being a mirror image of FIG. 17.
Figure 18:
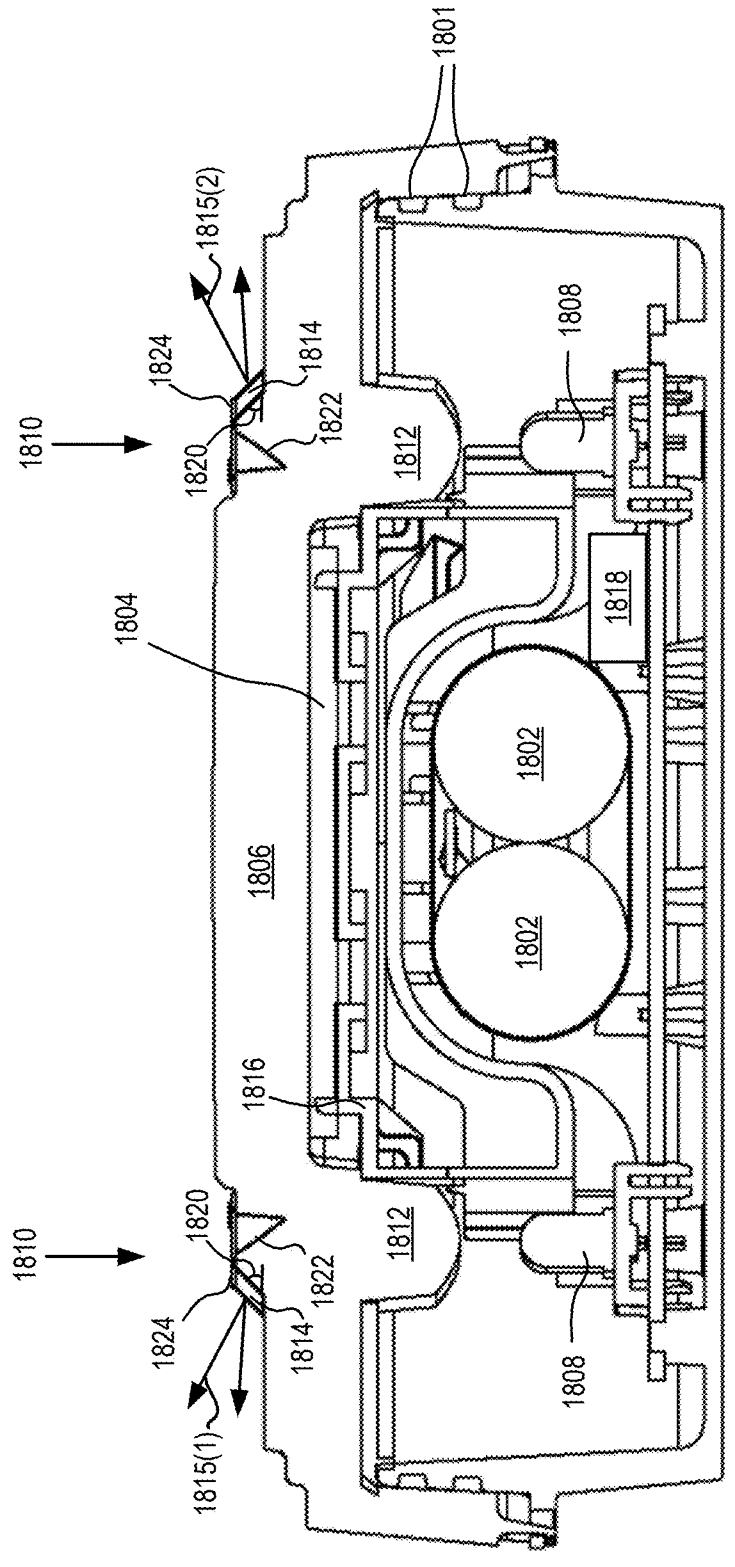
FIG. 18 shows a middle sectional view along the longitudinal axis of the electronics component of the illuminated roadway device of FIG. 1.
Figure 19:
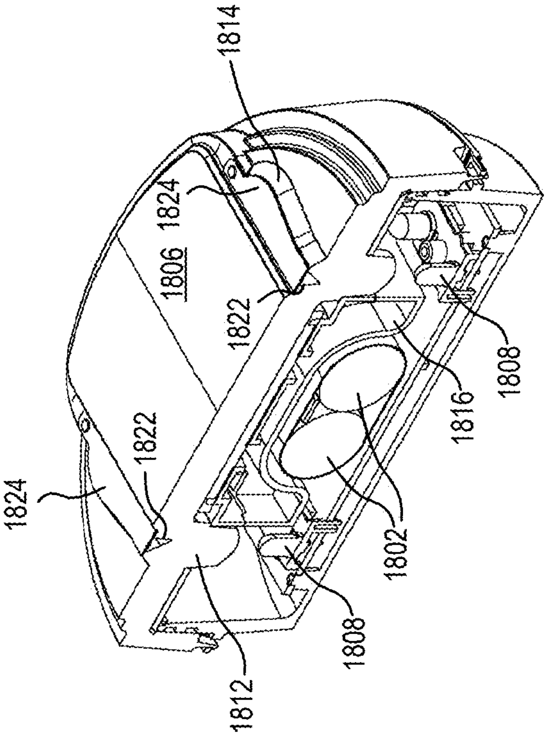
FIG. 19 shows a perspective sectional view along the longitudinal axis the electronics component of the illuminated roadway device of FIG. 1.

FIG. 1 shows a front top perspective view of an illuminated roadway device 100, in an embodiment. FIG. 2 shows a front bottom perspective view of the illuminated roadway device 100 of FIG. 1. FIG. 3 shows a top plan view of the illuminated roadway device 100 of FIG. 1. FIG. 4 shows a bottom plan view of the illuminated roadway device 100 of FIG. 1. FIG. 5 shows a right elevation view of the illuminated roadway device 100 of FIG. 1, with the left elevation being a mirror image of FIG. 5. FIG. 6 shows a front elevation view of the illuminated roadway device 100 of FIG. 1, with the rear elevation being a mirror image of FIG. 6. FIG. 7 shows an exploded perspective view of the illuminated roadway device 100 of FIG. 1. FIG. 8 shows a middle sectional view along a longitudinal axis of the illuminated roadway device 100 of FIG. 1. FIG. 9 shows a perspective sectional view along the longitudinal axis of the illuminated roadway device 100 of FIG. 1. FIG. 10 shows a front top perspective view of the outer shell 102 of the illuminated roadway device 100 of FIG. 1. FIG. 11 shows a front bottom perspective view of the outer shell 102 of the illuminated roadway device 100 of FIG. 1. FIG. 12 shows a front top perspective view of the electronics component 104 of the illuminated roadway device 100 of FIG. 1. FIG. 13 shows a front bottom perspective view of the electronics component 104 of the illuminated roadway device 100 of FIG. 1. FIG. 14 shows a top plan view of the electronics component 104 of the illuminated roadway device 100 of FIG. 1. FIG. 15 shows a bottom plan view of the electronics component 104 of the illuminated roadway device 100 of FIG. 1. FIG. 16 shows a right elevation view of the electronics component 104 of the illuminated roadway device 100, with the left elevation being a mirror image of FIG. 16. FIG. 17 shows a front elevation view of the electronics component 104 of the illuminated roadway device 100, with the rear elevation being a mirror image of FIG. 17. FIG. 18 shows a middle sectional view along the longitudinal axis of the electronics component 104 of the illuminated roadway device 100 of FIG. 1. FIG. 19 shows a perspective sectional view along the longitudinal axis the electronics component 104 of the illuminated roadway device 100 of FIG. 1. FIGS. 1-19 are best viewed together with the following description. It should be appreciated that certain reference numerals in the figures are only included on some of the figures but should equally apply to other figures where the same component is illustrated even if not included in that specific figure for clarity of illustration (for example, lower surface 1002 of outer shell 102 is numbered in FIG. 10, but not in other of FIGS. 1-19 although the curved surface is shown in those other figures).

Illuminated roadway device 100 includes an outer shell 102, an electronics component 104, and an impact plate 106. Illuminated roadway device 100 operates to emit light and better define roadway boundaries, lane boundaries, and/or direction of travel for drivers. Illuminated roadway device 100 balances the need for adequate efficiency and intensity of light emission from illuminated roadway device 100 while providing durability and reliability. The components of illuminated roadway device 100 provide a durable system that is flush or sub-flush mounted to a roadway and includes impact resistance to damage occurring during use.

Figure 31:
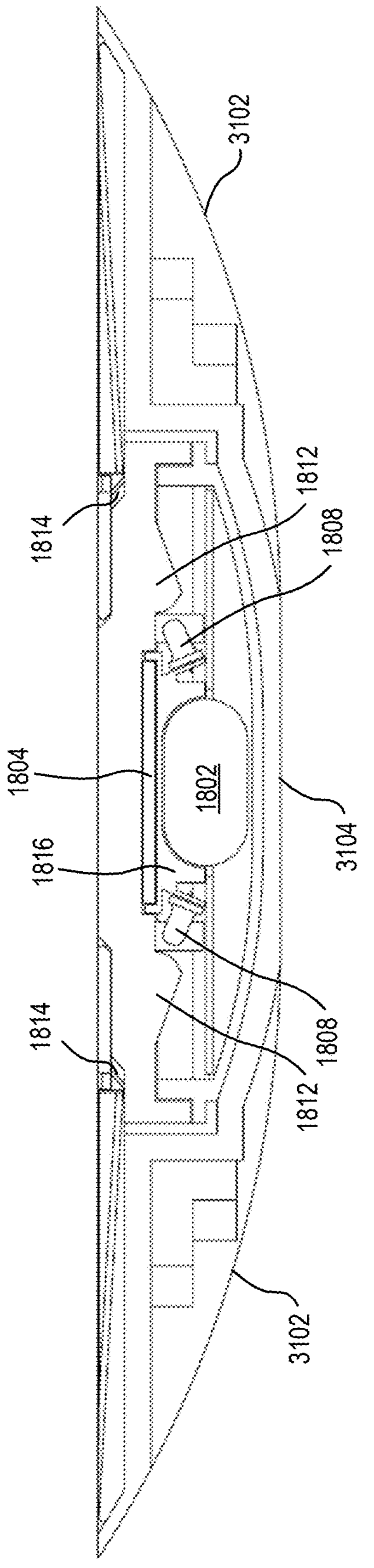
FIG. 31 shows a shallow illumination roadway device with additional or alternative features that may, in embodiments, be included in the illumination roadway device of FIGS. 1-30.

Outer shell 102 is fixable to a roadway 800 (illustrated only in FIG. 8 for clarity). In the embodiments of FIGS. 1-19, outer shell 102 is shown with a lower curved surface 1002 and an upper flat surface 1004. The lower curved surface 1002 may correspond to a shape of an installation indentation 802 (FIG. 8). In embodiments, installation indentation 802 is defined by the size and shape of a cutting device used to plunge cut in the roadway 800. In alternate embodiments, lower curved surface 1002 may include a flat portion (not shown) such as the lower-most portion of the surface, where the installation indentation 802 is not curved shaped but instead includes a flat section. FIG. 31 shows an example of this configuration with curved portions 3102 and flat portion 3104. For example, installation indentation 802 may include curved sections connected by a flat section where the saw performs a plunge and drag cut.

Lower curved surface 1002 may be defined by an array of supports 202 and filler component 204 located between adjacent supports of the array of supports 202. Additionally, or alternatively, lower curved surface 1002 may include one or more protrusions which may be a part of one or more of the supports 202, or may a distinct feature of lower curved surface 1002. The protrusions may aid in fixating the outer shell to the roadway, such as providing a greater and differing texture for adhesive or other mortar between the surface of the installation indentation 802 and the lower curved surface 1002. It should be appreciated that outer shell 102 may further include one or more protrusions to assist with fixating outer shell 102 to roadway 800.

In embodiments, lower curved surface 1002 may further include drainage apertures to allow water and moisture to exit the cavities within outer shell 102 and between electronics component 104 and outer shell 102. In embodiments, side surfaces of outer shell 102 include said drainage aperture, in addition to or in alternate, to the lower curved surface 1002 having said drainage apertures.

Upper flat surface 1004 may define an electronics component aperture 1006 sized and shaped to receive the electronics component 104. As shown in FIG. 10, electronics component aperture 1006 is within an impact plate aperture 1008 sized and shaped to receive the impact plate 106. In FIG. 10, impact plate aperture 1008 is shown having three sections 1008(1), 1008(2), and 1008(3) each corresponding to a portion of the impact plate 106. Electronics component aperture 1006 is shown in the middle section 1008(2) of impact plate aperture 1008. Sections 1008(1) and 1008(2) of impact plate aperture 1008 are shown having a slope with corresponding to the lower surface of the impact plate section corresponding thereto.

In embodiments, the electronics component aperture 1006 has a depth that is greater than a height or vertical dimension of electronics component 104 such that a sealed gap (to prevent environmental ingress such as moisture) exists between the bottom surface of electronics component aperture 1006 and the bottom surface of electronics component 104. This gap may advantageously reduce mechanical force applied between outer shell 102 and electronics component 104 as vehicles drive over the illuminated roadway device 100 when installed in the roadway 800.

In embodiments, illuminated roadway device 100 further includes an isolating cover 702 located between the electronics component 104 and outer shell 102. In such embodiments, electronics component aperture 1006 may be sized and shaped to accommodate the isolating cover 702 and the electronics component 104 when the isolating cover 702 is secured around electronics component 104. Isolating cover 702 may comprise a malleable material such as silicon, plastic, rubber, neoprene or other malleable material. Isolating cover 702 is shown an upper flange 704 extending over an upper surface 1202 (also referrable as a sealing surface) of an second housing 1204 of the electronics component 104, and a lower flange 706 extending over a lower surface 1206 of a first housing 1208 of the electronics component 104 to cover a connection 1210 of the second housing 1204 to the first housing 1208. Thus, when installed, isolating cover 702 provides water resistance and vibration dampening to the electronics component 104.

Electronics component 104 includes a housing comprising the first housing 1208, the second housing 1204 securable to the first housing 1208 via connection 1210. It should be appreciated that, while first housing 1208 is shown as a lower housing and second housing 1204 is shown as an upper housing, the housings may be a different configuration, such as two or more side housings connected at a vertical seam, or other configuration including more than two housing parts. Connection 1210 is shown as a snap-fit connection, but may be other type of connection such as adhesive, screw, or another fastener. Referring to FIG. 18, electronics component 104 may include a power device 1802 secured within the electronics component. Power device 1802 may be a rechargeable battery, or another type of rechargeable power source such as a supercapacitor. Connection 1210 may further include a sealing component 1801. For example, sealing component 1801 is shown as a radial seal between second housing 1204 and first housing 1208. In a particular embodiment, sealing component 1801 is a dual tapered radial seal. Other seal mechanisms (such as O-rings, elastomer seals, etc.) may be used without departing from scope hereof.

Electronics component 104 may include a solar power generation component 1804 in coupled with the power device 1802 (either directly or through a power management system (PMS)) to recharge the power device 1802. Solar power generation component 1804 is aligned with an optically transparent window 1806 which is integral to 1204 such that ambient light passes through optically transparent window 1806 and is received by solar power generation component 1804 and converted to electricity for trickle charging power device 1802 and powering other components of electronics component 104.

Electronics component 104 may include at least one light-emitting device 1808. In the embodiment of FIGS. 1-19, electronics component 104 includes six light-emitting devices 1808 are shown (1808(1) and 1808(2)). More or fewer light-emitting device 1808 may be included without departing from scope hereof. Electronics component 104 further includes at least one optic arrangement 1810, which includes a light collimator 1812 and a light-emitting surface 1814. Light collimator 1812 is defined by the second housing 1204 and is in optical communication with light-emitting surface 1814. Each light-emitting device 1808 is aligned with the optic arrangement such that light emitted by the light-emitting device enters the light collimator 1812.

Optic arrangement 1810 is configured to reduce light emission from the illuminated roadway device at an angle normal to the roadway. Advantageously, this does not impact the environment and instead directs the light towards vehicles oncoming towards each illuminated roadway device 100 installed in the roadway 800. For example, optic arrangement 1810 may be configured (e.g., using the angle of the light-emitting surface 1814) to emit a spread of light (e.g., a cone of light) at 15 degrees or greater vertical spread from the surface of roadway 800. Alternate spreads of light may be implemented without departing from the scope hereof, including 0 to 10-degree vertical spread of light. Individual sections of light emitting surface 1814 may be combined or otherwise overlap to increase the overall spread of light emitted from illuminated roadway device 100.

Optic arrangement 1810 is shown as an integral component of second housing 1204. As such, it should be appreciated that second housing 1204 may be an optically transparent material, such as optically transparent polycarbonate.

Light-emitting surface 1814 may include a first light-emitting surface and a second light-emitting surface that each emit light in different directions (such as first direction 1815(1) and second direction 1815(2) in FIG. 18, respectively). As such, where there are multiple light-emitting devices 1808, a first device 1808 (or group thereof) may emit light in a first color and a second device 1808(2) (or group thereof) may emit light in a second color different from the first color. The different colors may be emitted from different instances of electronics component 104 within a given outer shell 102 or from a different light emitting devices 1808 within a single electronics component 104. This allows illuminated roadway device 100 to transmit the first color corresponding to the correct flow direction of traffic and the second color corresponding to an incorrect flow direction of traffic. For example, the second color may be a red wavelength of light and the first color may be a white or yellow wavelength of light. The emitted color may be defined by application-specific requirements. For example, the emitted color may be defined according to ASTM D4280 regarding yellow and white chromaticity requirements. The emitted color may be pre-defined, or may be provisioned via a provisioning signal as discussed below. The housing of electronics component 104 may include indicators (points, arrows, writing) indicating desired installation direction and color emission directions.

In embodiments including a plurality of electronics components 104, a first electronics component may emit light in a first direction, and a second electronics component may emit light in a second direction different from the first direction. Moreover, each of the first/second electronics component may emit light of differing colors.

Where there is a plurality of light-emitting devices 1808, there may be a single light collimator 1812 dedicated to multiple of the light-emitting devices 1808, or there may be individual light collimator 1812 associated (aligned and adapted to receive light from) each individual or grouping of light-emitting devices 1808. For example, each light collimator 1812 may be a protrusion of material forming second housing 1204. As another example, the light collimator 1812 may be a row collimator aligned with a plurality of the light-emitting devices 1808.

Figure 20A:
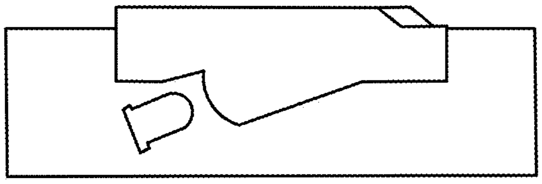
FIGS. 20A, 20B, 20C, and 21-25 show various configurations of light patterns defined by the optic arrangement of the illuminated roadway device of FIG. 1.
Figure 29:
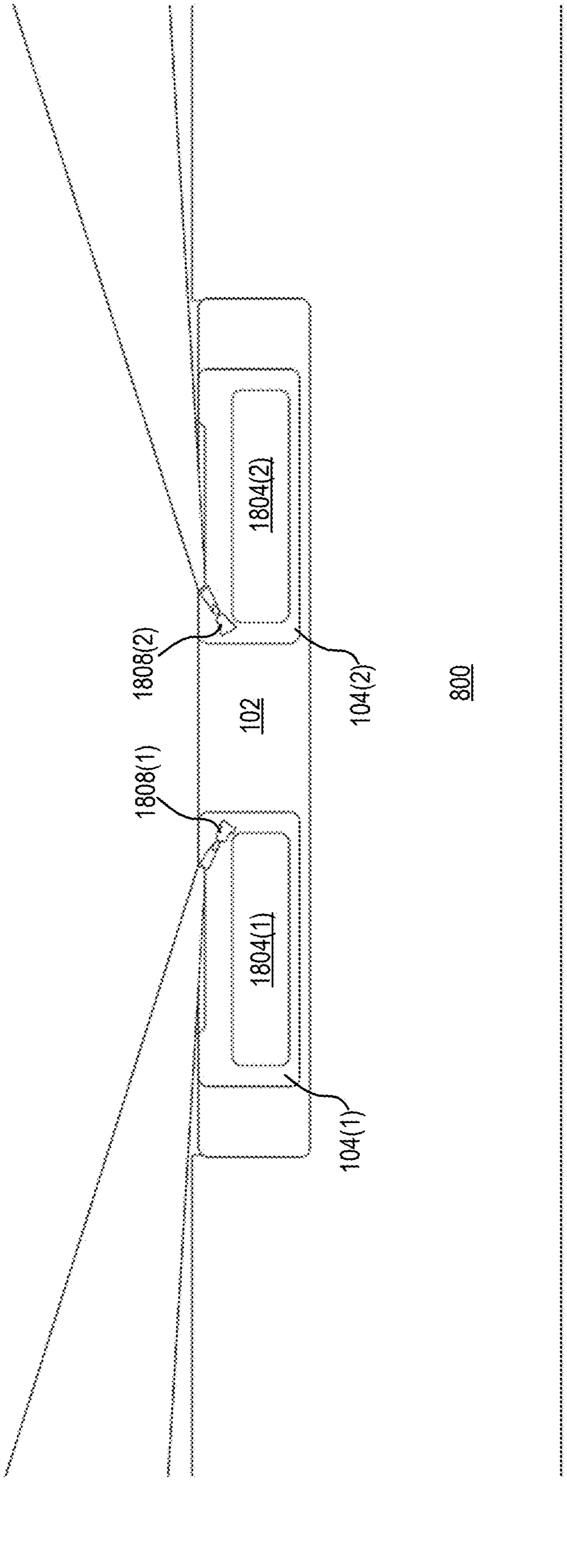

Optic arrangement 1810 is shown integral to second housing 1204. As such, optic arrangement 1810 forms a reflection surface 1822 between light collimator 1812 and light-emitting surface 1814 such that light entering light collimator 1812 exits light-emitting surface 1814. Reflection surface 1822 may be a total internal reflection surface. It should be appreciated that the reflection surface 1822 is optional, and light may be transmitted through the material of second housing 1204 without reflection without departing from scope hereof. For example, FIGS. 20A, 29 and 31 show light emitting from light-emitting device 1808 and out of light emitting surface without reflection. The light-emitting device 1808 may be mounted within electronics component 104 to achieve the desired emission angle and reflection (or not) within optic arrangement 1810. Additionally, or alternatively, one or more of the surfaces of optic arrangement 1810 may include a reflective surface (such as coated with a reflective metal surface, or other reflective material) to specifically direct light rays to a desired direction. Moreover, referring to FIG. 14, the light-emitting surface 1814 may be shaped, or have a plurality of sections 1402, to control the emitted light spread to desired locations for a given application. Each section 1402 may be contiguous with one another, or may be separated to have differing light emission pattern(s).

The optic arrangement 1810 may further include a protective cover 1824. Protective cover 1824 may be an integral component of second housing 1204, or may be a separate component secured thereto. In the example in the figures herein, protective cover 1824 is shown covering reflection surface 1822.

Because light emits from the LED in light spread of a three-dimensional fashion, specifically a cone, there are two major viewing angles to consider: horizontal and vertical. Horizontal viewing angle refers to the left/right distance on the roadway that is exposed to the light and primarily affects how quickly drivers will see the illuminated roadway device 100 when approaching it from an angle, such as when turning a corner. Vertical viewing angle refers to the area above the roadway that is visible during approach, and primarily affects when drivers will see the roadway. As discussed above, each section 1402 may be coordinated to accumulate the various light spread (light cone) emission patterns to achieve the desired emission pattern. The configuration of optic arrangement 1810 may vary depending on the desired application and desired light spread emitted from illuminated roadway device 100. For example, the angle of tilt of light-emitting surface 1814 may vary the spread pattern. In one embodiment, the light-emitting surface 1814 has a tilt angle 1820 of 30 degrees or less. In another embodiment, the light-emitting surface 1814 has a tilt angle 1820 of 45 degrees or less. In yet another embodiment, the light-emitting surface 1814 has a tilt angle 1820 of 60 degrees or less, where the tilt angle 1820 is measured with respect to an X-axis corresponding to the longitudinal axis of electronics component 104. Varying tilt angle 1820 impacts the intensity and efficiency of light emitted across the light emission spread. In embodiments, the optic arrangement 1810 is configured to emit light such that the light is visible at 250 feet away from the illuminated roadway device 100, wherein the brightness of the light emitted to this distance is consistent with brightness constraints or other headlight data used to define retro reflectivity regulatory minimums associated with the mounting location of illuminated roadway device 100. The term "visible" will be understood by those of ordinary skill in the art and may be defined based on certain conditions, such as, but not limited to, ambient light (nighttime), weather conditions, obstructions, etc.

Figure 20B:
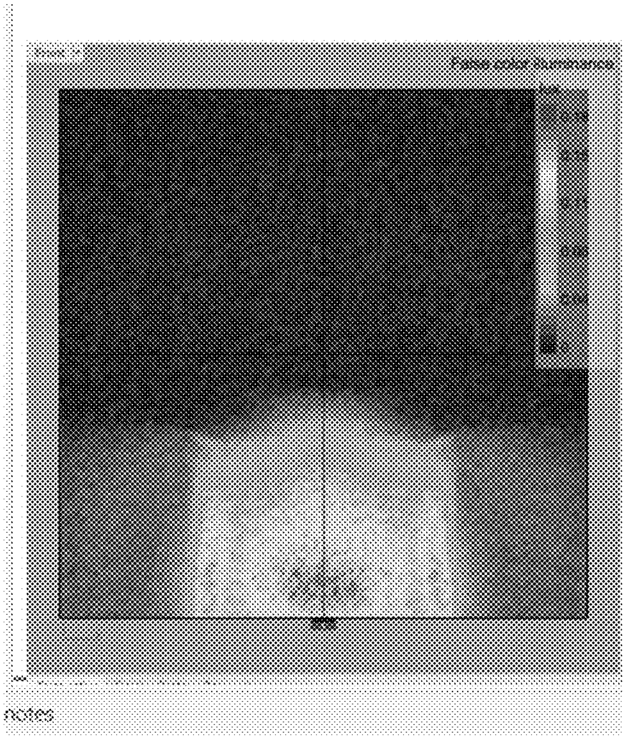
Figure 20C:
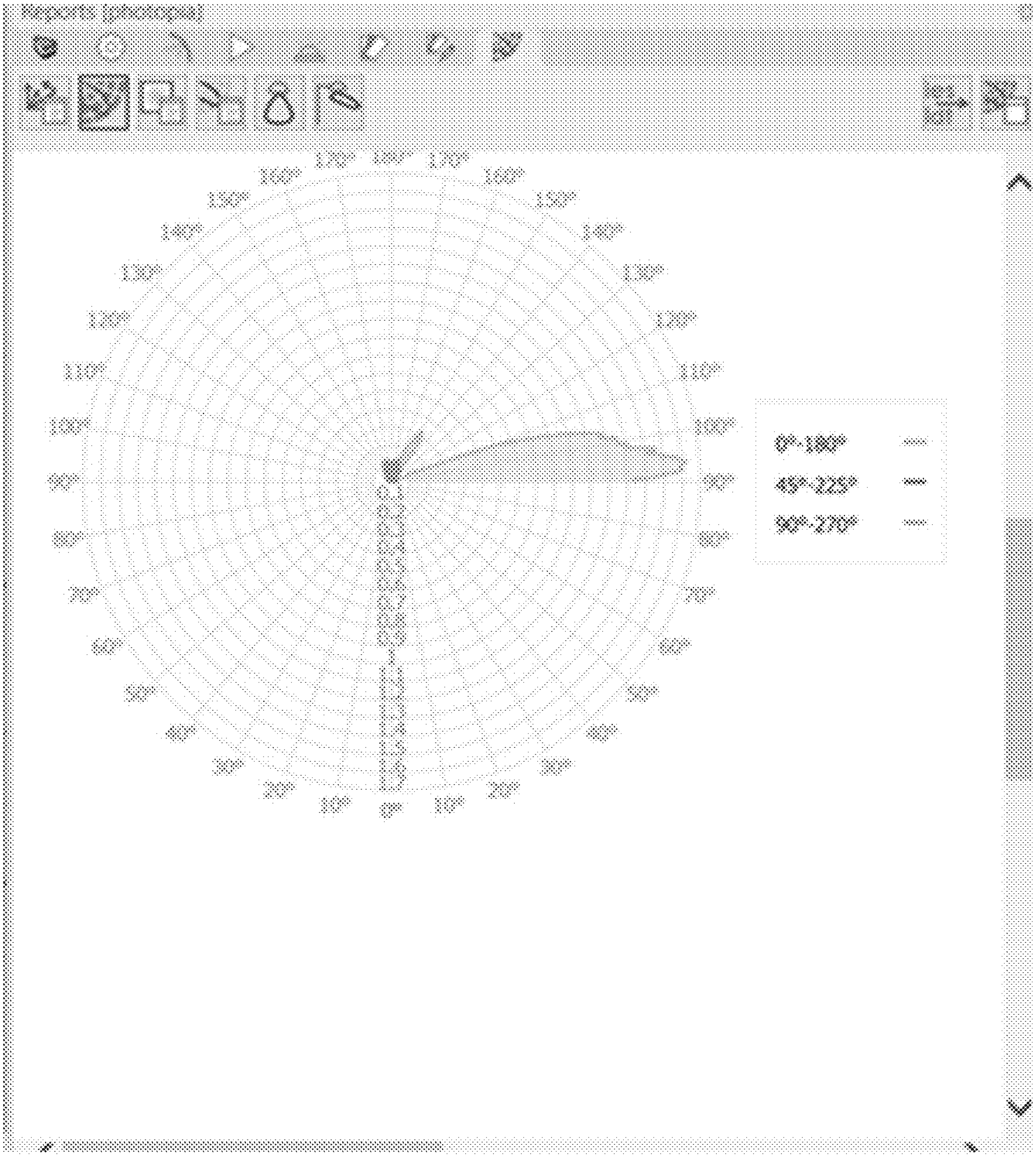

FIG. 20A-C shows an example of optic arrangement 1810, and an emission pattern thereof. As shown, the maximum intensity of the emission is between zero) ($\Phi=90°$) and 20 degrees ($\Phi=110°$). This emission pattern is defined by the configuration of optic arrangement 1810, and the shape of the light-emitting surface 1814, light collimator 1812, and internal reflective surfaces. Thus, the emission patterns can be configured based on the desired application. As shown, the FIGS. 21-25 show various configurations of light patterns defined by optic arrangement 1810.

For the purposes of these illustrations, a 15-degree emission cone is considered. Optical tools such as lenses and mirrors may further be included in optic arrangement 1810 to alter the emission profile (in terms of size, shape, and intensity). Each illuminated roadway device 100 may be placed on either the side or the center of the roadway. In most cases, half the width of the roadway (the difference between being placed on the side or the center) has a trivial impact compared to the other geometries at place here; in order to assume the worst-case scenario, the examples in FIGS. 20-25 assume that the illuminated roadway device 100 are installed in the middle of the road.

Figure 21:
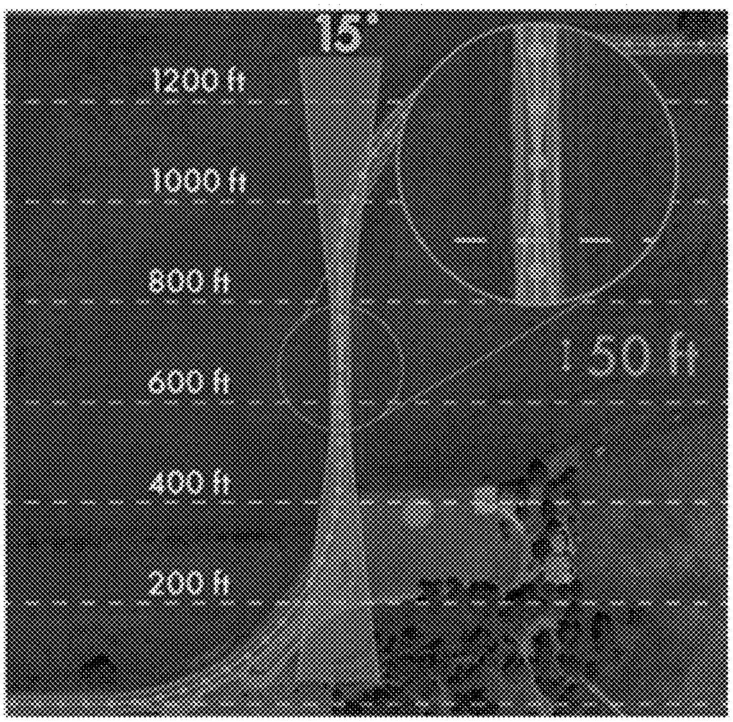
Figure 22:
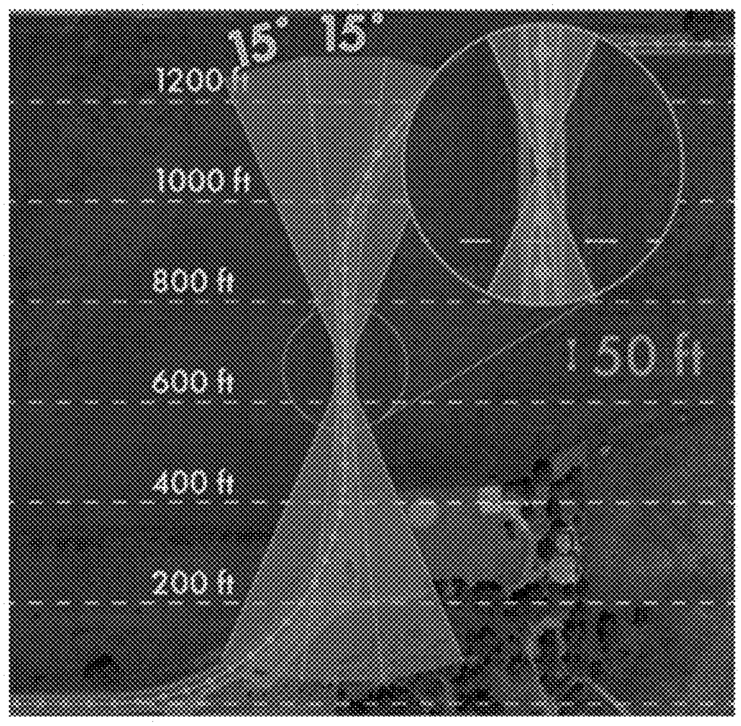

Notably, on a straight section of roadway, such as shown in FIGS. 20-22 a single LED emission cone is visible from any spot on the road within ~75 feet from the base of the illuminated roadway device 100. 75 feet in the above embodiment is just an example, the actual range may be more or less than 75 feet without departing from the scope hereof. The horizontal viewing angle has minimal impact on the distance at which the driver begins seeing the illuminated roadway device 100, and primarily drives the distance at which the driver stops seeing the illuminated roadway device 100. This distance can be reduced if more light-emitting devices 1808 are used in the illuminated roadway device 100, effectively increasing the horizontal viewing angle only-the vertical cone is not increased in height unless light-emitting surface 1814 is modified.

Spacing between each illuminated roadway device 100 within roadway 808 may be configured based on the illumination capabilities of the given illuminated roadway device 100. The distance between individual illuminated roadway device 100 may be configured such that at least two, or in embodiments at least three, illuminated roadway device 100 are all visible to a driver (assuming average driver position with respect to the roadway based on average driver heights, vehicle heights, etc.), that a path is thereby communicated to the driver, thus improving safety.

As shown in FIG. 22, with three light-emitting devices 1808, the illuminated roadway device's 100 nominal brightness cone remains visible along the entire roadway until the driver is within ~35 feet of the beacon (again, 35 feet is just an example and not limiting). Note: given the viewer's proximity (35 ft) to the illuminated roadway device 100, photons outside the nominal brightness cone might provide enough diffuse illumination for visibility. These numbers also drive the distance necessary between illuminated roadway devices 100 along the roadway: as long as the subsequent illuminated roadway device 100 is visible once the driver stops seeing a given illuminated roadway device 100, the illuminated roadway device series is still performing its desired task.

Figure 23:
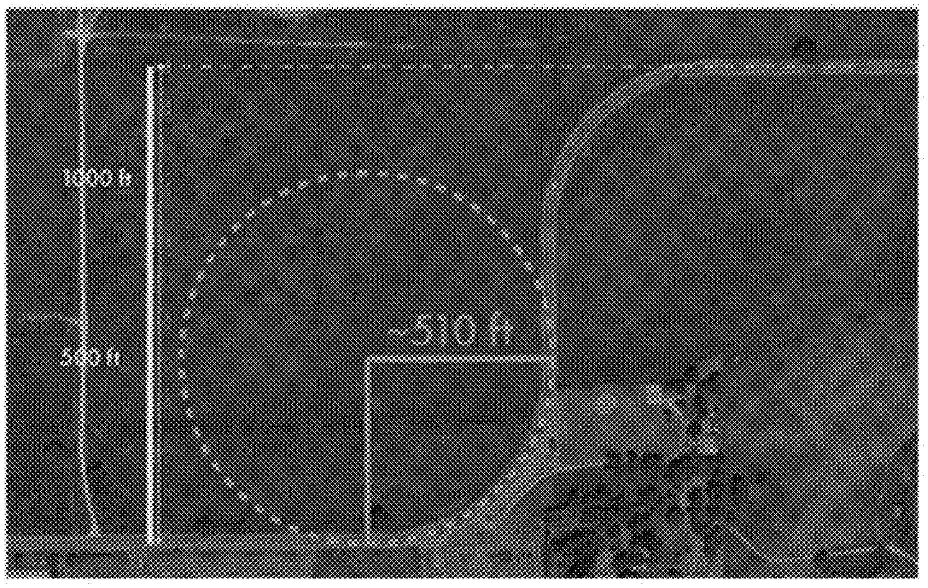
Figure 24:
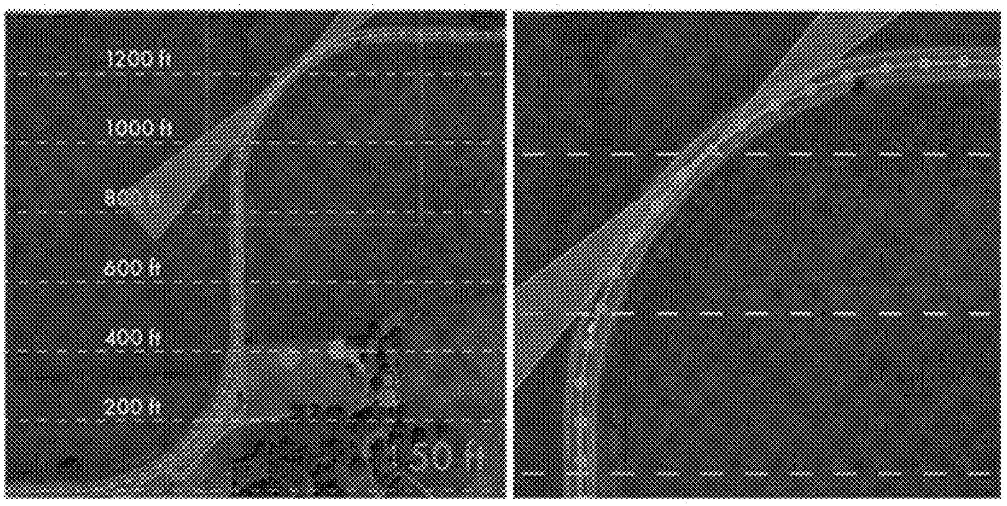
Figure 25:
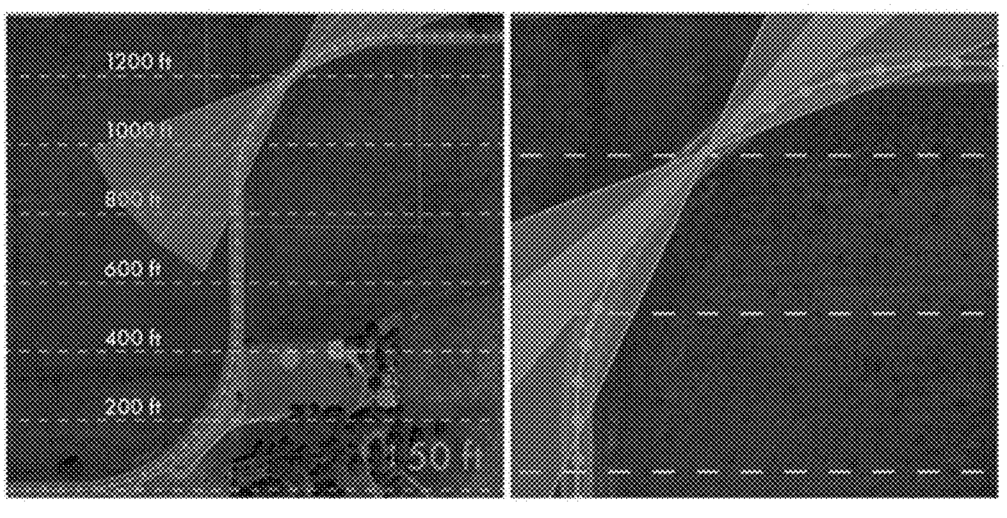

A primary concern that is crucial to horizontal viewing angle is the angle at which the driver is approaching the light-this is driven by the radius of curvature of the roadway (when viewed from the above) as shown in FIGS. 23-25. Taking the curve shown in the FIGS. 23-25 the specified curvature has a radius of approximately 510 feet. At this curvature, once again viewing the most unideal portion of the turn. An illuminated roadway device 100 placed with a single light-emitting device 1808 is only visible when the user is within 50-150 feet. If the driver is further than 150 feet, the light cone is pointing off of the road. Increasing the light-emitting device 1808 coverage to three light-emitting devices 1808, as before, does mitigate the problem to an extent. With the triple light-emitting device 1808 setup discussed previously, the horizontal viewing angle is once again improved, and visibility is increased to 300 feet. This represents significant improvement from a single light-emitting device 1808 configuration. Again, the 50-150 feet discussed here is just an example and actual installations may have optic arrangement 1810 that implement longer or shorter visibility ranges.

Referring to FIG. 18, electronics component 104 further includes a support 1816. Support 1816 is dual-purpose in that it supports and accommodates the shape of the power device 1802 on a first side (upper side) of support 1816 and the solar power generation component 1804 on a second side (lower side) of support 1816. The functionality of support 1816 may be more than dual-purpose, such as shown in FIG. 31 which shows that light emitting devices 1808 are also mounted on the support 1816 at a desired emission angle. The arrangement of the components of solar power generation component 1804, including mounting location and configuration of support 1816 and light-emitting device(s) 1808 aids in the reduction of size of the electronics component 104 and consequently illuminated roadway device 100, such as the reduced-depth ("shallow") configuration shown in FIG. 31. This advantageously allows, in at least some embodiments, an overall height of illuminated roadway device 100 to be less than 2.5 inches, and in some embodiments less than 2 inches. Alternative heights may be implemented without departing from scope hereof. In embodiments, support 1816 is metal (steel) thereby providing greater structural support for the overall electronics component 104, which has a polycarbonate housing structure for weather resistance and optical transparency. However, it should be appreciated that support 1816 may be other materials, such as polycarbonate as well.

Electronics component 104 may be controlled using a controller 1818. Controller 1818 may include necessary power management circuitry/logic, control circuitry/logic, etc. and may be implemented as one or more microprocessors, microcomputers, single board computers, microcontrollers, digital signal processors, central processing units, graphics processing units, logic circuitries, and/or any devices that manipulate data based on operational instructions.

Figure 26:
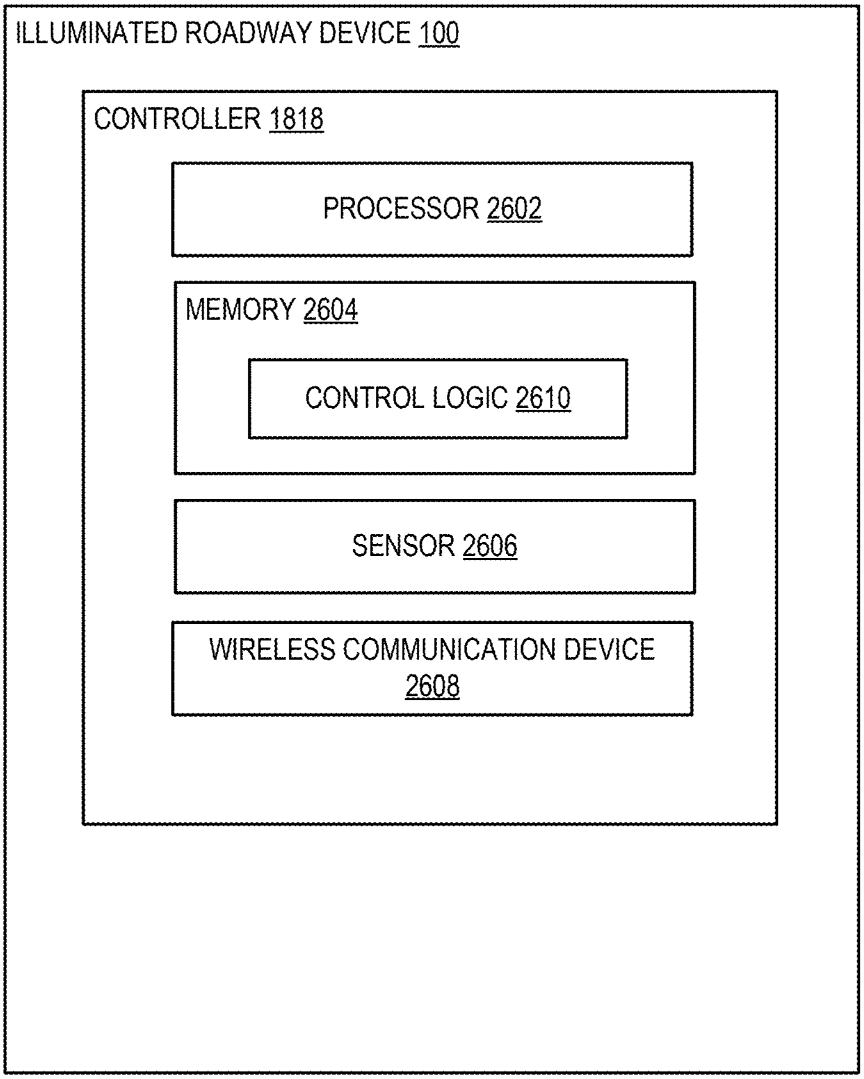
FIG. 26 shows details of controller in further detail and the discussion of FIG. 26 applies to any of the embodiments shown and discussed herein.

FIG. 26 shows details of controller 1818 in further detail and the discussion of FIG. 26 applies to any of the embodiments shown and discussed herein. Among other capabilities, one or more processor(s) 2602 are configured to fetch and execute computer-readable instructions stored in memory 2604 of the controller 1818. The memory 2604 may store one or more computer-readable instructions or routines, which may be fetched and executed to implement any functionality discussed herein. Memory 2604 may include any non-transitory storage device including, for example, volatile memory such as RAM, or non-volatile memory such as EPROM, flash memory, etc.

One or more processor(s) 2602 may be coupled with one or both of a sensor 2606 and a wireless communication device 2608. In one embodiment, sensor 2606 includes a magnetic sensor (such as a hall-effect sensor). An external magnetic device (which may be user held or mounted on a vehicle and activated while the vehicle is passing the illuminated roadway device 100) may interface with the magnetic sensor to provision the controller 1818. Wireless communication device 2608 may be a radio frequency (RF)-based wireless communication device, wherein a wireless control signal received by one or more processor(s) 2602 is an RF control signal that interfaces with the (RF)-based wireless communication device. Wireless communication device 2608 may be a passive (e.g., RFID) or active communication device. In one embodiment, the wireless communication device 2608 is a short range (e.g., BlueTooth®, NFC, or other short-range communication protocol) or long-range (e.g., cellular-based or satellite-based communication protocol) that allows the illuminated roadway device 100 to communicate with an external device (such as a road user including but not limited to automobiles, bicycles, motorcycles, drones, autonomous vehicles, tractor trailers, trains, and other devices using the roadway) either for provisioning of the illuminated roadway device 100 or for direct communication regarding other data such as traffic patterns, etc. In an additional, or alternative, embodiment, the sensor 2606 and/or wireless communication device is capable of receiving and/or transmitting light-based signals which are translated by one or more processor(s) 2602.

As such, memory 2604 may include control logic 2610 that is configurable using the sensor 2606 and/or a wireless communication device 2608. Control logic 2610 may define light patterns (e.g., color, direction, frequency, activation times, etc.) of light emitted by the light-emitting device(s) 1808. Additionally, or alternatively, the control logic 2610 may define hysteresis associated with the illuminated roadway device 100 wherein sensed ambient light causes the light-emitting device 1808 to be activated and/or deactivated. The hysteresis may require the ambient light to be above/below a given threshold for a duration of time such that oncoming headlights do not cause false deactivation of the light-emitting device(s) 1808.

The control logic 2610 may further enable communication, using wireless communication device 2608 of information regarding illuminated roadway device 100 to an external device, such as a server, passing vehicle, maintenance vehicle and/or associated device, etc. Said information regarding the illuminated roadway device 100 may include one or more of status, health information, and/or battery life information of the illuminated roadway device 100. Additionally, or alternatively, some or all of said information could be transmitted by patterning the light emitted from light-emitting device 1808. For example, control logic 2610 may be configured to control modulation (e.g., frequency of the light) of the light-emitting device 1808 to indicate battery/device health/state via illumination. This pattern could then be read by a pattern reading device' (e.g., if modulated at 1 khz=healthy device, 750 hz indicates end of life, and 500 hz indicates critical failure imminent/replace). Advantageously, these frequencies are not visible to a human driver, but a camera system (example of a pattern reading device) could identify the pattern.

Accordingly, control logic 2610, when executed by the one or more processor(s) 2602 may cause the electronics component 104 to receive, via a wireless control signal, received using one or both of the sensor 2606 and the wireless communication device 2608, provisioning data for configuring the electronics component and store the provisioning data as control logic 2610. Furthermore, the control logic 2610 may then output, using a light-emitting device (e.g., light-emitting device 1808), light according to the provisioning data defined in control logic 2610. In at least some embodiments, the output light according to the provisioning data may include outputting a pattern of light to communicate with an approaching vehicle.

In addition to emitting light according to the provisioning data, the control logic 2610 may cause illuminated roadway device 100 to output a wireless communication signal using a RF-based wireless communication device (e.g. wireless communication device 2608) to communicate with an oncoming vehicle or other external device.

In addition to emitting light according to the provisioning data, the control logic 2610 may cause illuminated roadway device 100 to detect ambient light; and control activation of the light-emitting device 1808 based on the ambient light level. Provisioning data may further include initial activation settings. For example, a required ambient light level may need to be detected, or detected over a threshold period (defined as a temporal period, or as a charge cycle), prior to "waking up" (turning on from a very low power state) during storage and installation of the illuminated roadway device 100. Furthermore, the control logic 2610 may cause illuminated roadway device 100 to deactivate light-emitting device when the ambient light level is above a threshold for a predetermined amount of time.

The impact plate 106 may be a single integral plate that spans the upper surface of the illuminated roadway device 100. In the particular embodiments shown herein, impact plate 106 is shown comprising a plurality of plate sections 306(1), 306(2), 306(3). Each 306 may be the same material as other sections, or a different material. For example, the middle 306(2) of the plurality of plate sections 306 may be steel, and the outer sections 306(1) and 306(3) may be a composite plastic material. Therefore, the outer sections 306(1) and 306(3), which may be more susceptible to damage via chains and snowplows, are less likely to bend but instead will snap off during a damage event. Moreover, the composite plastic material is lightweight as compared to metal material while still maintaining structural integrity. Composite material is more likely to snap instead of bend (as compared ot metal material) and thereby the overall profile of the illuminated roadway device 100 even when damaged is likely to be flush with the roadway surface.

Middle 306(2) is shown defining a solar-power aperture 310. Solar-power aperture 310 is aligned with solar power generation component 1804 such that solar power generation component 1804 receives light during use of illuminated roadway device 100. Moreover, each outer section 306(1) and 306(2) define a negatively-sloped optic ramp 312(1), 312(2) respectively aligned with light-emitting surface 1814. The optic ramps 312 being negatively sloped from an outer edge of illuminated roadway device 100 towards the optic arrangement 1810 allows the illuminated roadway device 100 to be mounted flush to the roadway 800 while maintaining an optical pathway for light emitted by illuminated roadway device 100. It should be appreciated that in embodiment, the impact plate only includes middle section 306(3), and the negatively sloped optic ramp 312 is formed by shape of an upper surface of the electronics component. Impact plate 106 is secured to outer shell 102 via one or more fasteners 314.

Figure 27:
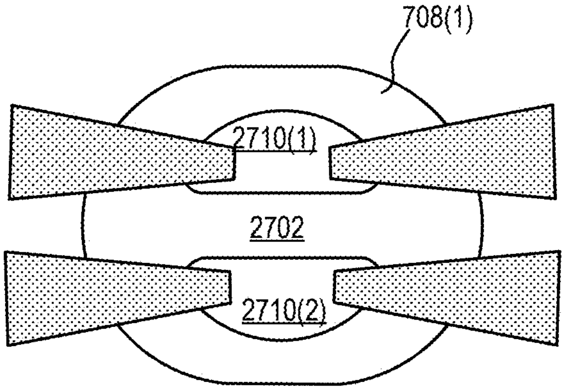
FIG. 27 shows an embodiment of middle section that includes a cross-support section the spanning solar-power aperture, which thereby comprises a first solar-power aperture and a second solar-power aperture.

Impact plate 106 may further include cross-support sections to further aid in supporting and protecting various areas of illuminated roadway device 100. For example, FIG. 27 shows an alternative embodiments of an impact plate (e.g., impact plate 106), or section thereof, that includes a cross-support section 2702 spanning solar-power aperture 310, which thereby comprises a first solar-power aperture 2710(1) and a second solar-power aperture 2710(2). Moreover, the solar-power aperture may also be sized and shaped to align with the light emitting surface and the optical window aligned with the solar power generation device, as shown in FIG. 27, where light emitted passes through one or more sections of solar-power aperture 310. Aperture 310 may be filled with an additional polycarbonate lens that is optically transparent to further improve impact resistance while maintaining optical transparency. Moreover, smooth (flush) surfaces on the upper (exposed) surface of illuminated roadway device 100, such as would be obtained if solar-power aperture 310 is filled with additional polycarbonate material provides the benefit of less fouling due to snow, dirt, and other debris not having cavities to fill on the upper surface of illuminated roadway device 100.

In embodiments, illuminated roadway device 100 may further include at least one mounting tab 108. The mounting tab(s) 108 may be removably securable to one or both of the impact plate 106 and the outer shell 102 to assist in mounting the illuminated roadway device 100 flush with the roadway 800. In embodiment, the mounting tabs 108 are configured for non-flush mounting arrangements, such as sub-flush to the roadway 800 or above-flush to the roadway 800. In embodiments, the at least one mounting tab 108 are the biodegradable, such as made from paper pulp or Polyactic Acid (PLA).

Figure 28:
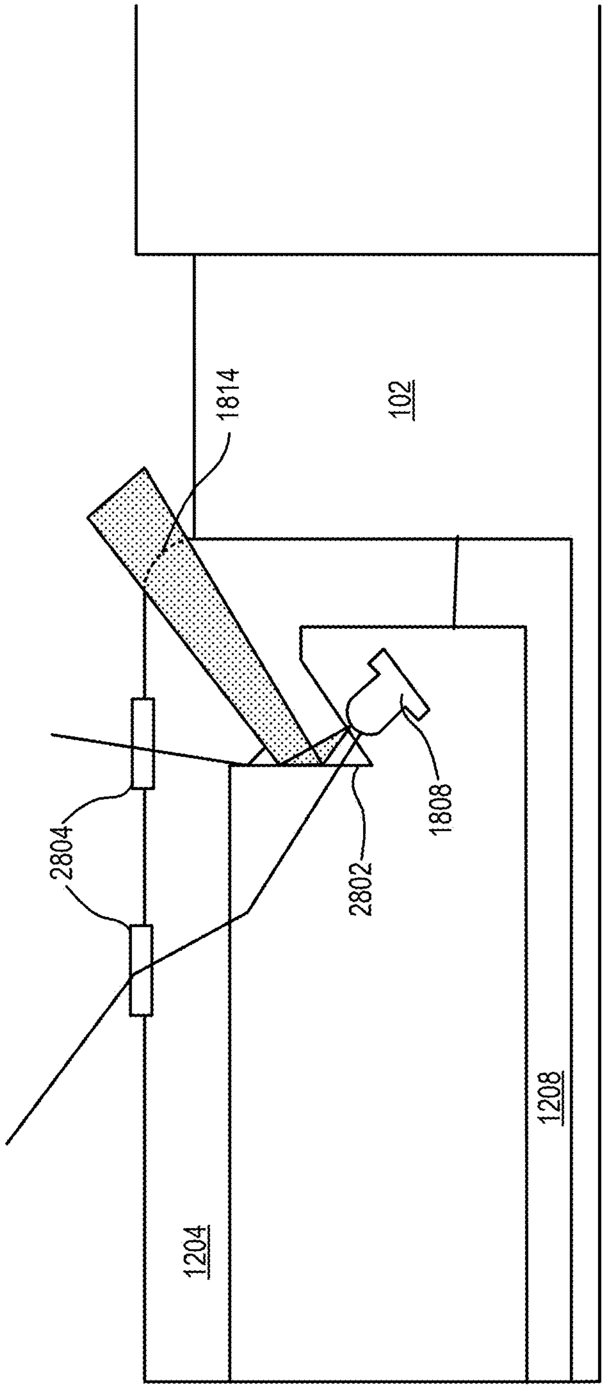
Figure 30:
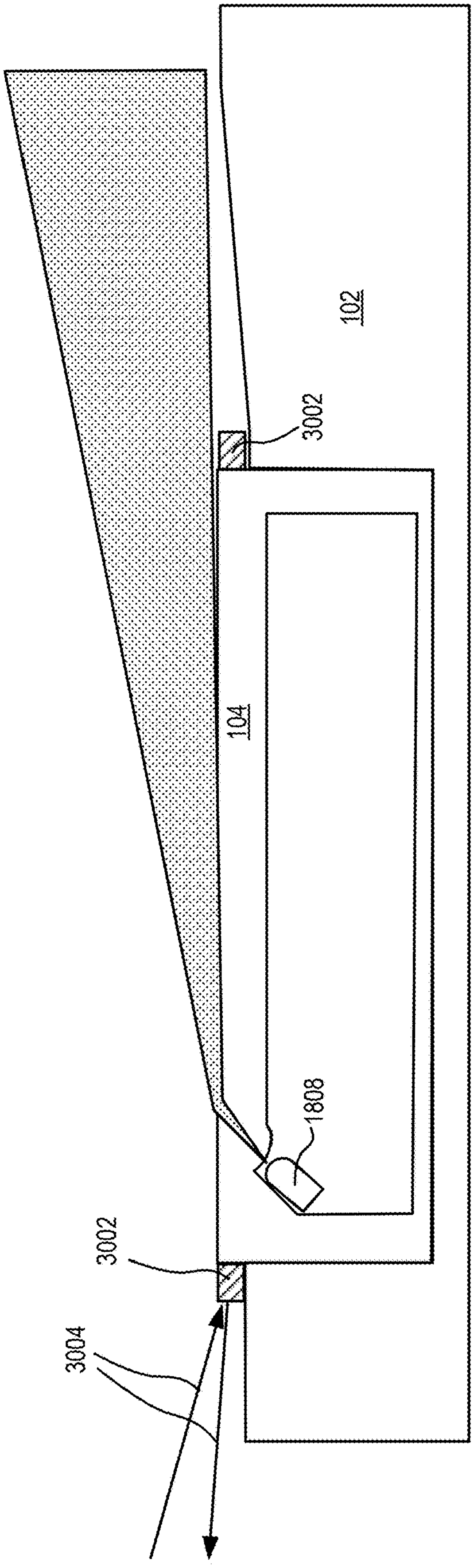

FIGS. 28-30 show additional features of illuminated roadway device 100 that may be included in the embodiments of the illuminated roadway device 100. Features of FIGS. 28-30 may be incorporated into the embodiments of FIGS. 1-19 without departing from scope hereof.

In FIGS. 28-29, the light-emitting device 1808 is not mounted with a chief ray emitting normal to the surface of the roadway, but instead mounted at an internal angle within illuminated roadway device 100. This provides the advantage that the overall depth of illuminated roadway device 100 may be reduced. Furthermore, in FIG. 28, the internal housing of illuminated roadway device 100 includes a reflection surface 2802 (which is an example of reflection surface 1822.) that reflects light out of illuminated roadway device 100 via light-emitting surface 1814 according to the desired angle of emission of the primary emitting ray and according to the desired spread of light emission.

Additionally shown in FIG. 28 is the optional embodiment of diffuser surface 2804 which may be a component of second housing that directs a reduced portion of the emitted light upwards or at a different angle than the primary emission direction. This may allow for limited visibility to airborne vehicles such as planes or drones, or for emission towards other directions not associated primary oncoming traffic using the roadway (such as visibility to cross traffic where the diffuser surface emits light towards said cross traffic). The ratio of intensity of the primary light emitted out of light-emitting surface 1814 to secondary light emitted out of diffuser surface may be any desired ratio, such as 2:1, 5:1, 10:1 or therebetween.

Figure 33:
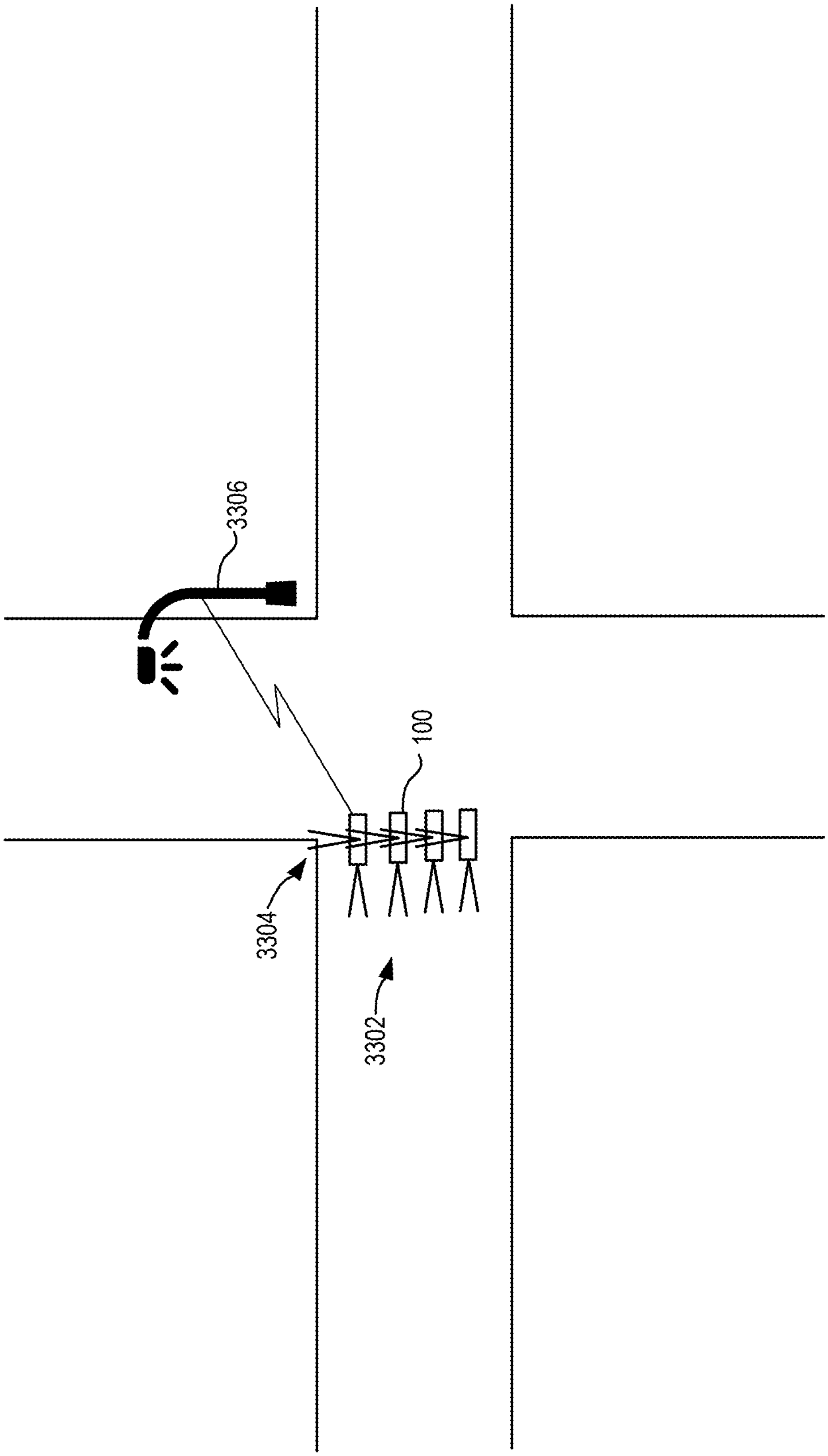
FIG. 33 shows a crosswalk use case of a dual-direction illuminated roadway device.

Alternatively, instead of or in addition to a diffuser, the electronics component 104 may include two optic arrangements 1810 where one optic arrangement 1810 emits light in a first direction, and the second optic arrangement emits light in a second direction. Moreover, the emitted light may be different colors. FIG. 33, for example, shows a use example where a first optic arrangement transmits according to the flow of traffic as indicated by emissions 3302, and the second embodiment transmits according to cross-walk direction, as indicated by emissions 3304. In this example, the light spread of the first optical arrangement may be smaller in the vertical component (e.g., a 15-20 degree cone of light by each optic arrangement), and the light spread of the second optical arrangement may be a greater vertical component (e.g., 30-60 degree cone of light) so as to illuminate the target (e.g., a person) to be more visible to oncoming traffic. FIG. 33 also shows that the electronics component may be coupled to an external device, such as a cross-walk light 3306. Control signals from the cross-walk light 3306 may be transmitted to each electronics component, and the electronics component may configure its light emission based thereon. For example, when the cross walk is active so people can walk across, light emission 3302 towards the traffic may be controlled to red indicating to stop prior to the cross walk, and the light emission 3304 may be controlled to white to better illuminate pedestrians in the cross-walk.

FIG. 29 illustrates the feature that a single outer shell 102 may house a plurality of electronics component 104. Although FIG. 29 shows that two light emitting electronics components are housed in a single outer shell 102, it should be appreciated that other functioning electronics components (e.g., with or without light emitting devices) could be included. For example, there may be a single light emitting electronics component, and one or more separate wireless communication functioning electronics components that do not transmit light. Two electronic components 104(1) and 104(2) are housed in a single outer shell 102. It should be appreciated that there may be more than two electronic components to a given outer shell 102 without departing from scope hereof. In the embodiment shown in FIG. 29, each electronics component 104 emits light in an opposite direction from the other. However, it should be appreciated that each electronics component 104 of the plurality of electronics components 104 in the single outer shell 102 may emit in the same direction, or in multiple directions (similar or different) without departing from scope hereof.

FIGS. 29 and 30 also illustrate the additional or alternative feature that each light-emitting device 1808 may emit light across the given solar power generation component 1804 (e.g., cross-body) without departing from scope hereof. In such instances, the given light-emitting surface 1814 is arranged to emit light over the solar power generation component 1804 and the optic window associated therewith. This arrangement advantageously reduces needed width for the electronics component 104 because the light emission channel also serves a dual purpose of optic window for the solar power generation component 1804.

FIG. 30, in addition to showing the cross-body (across the optic window associated with the solar power generation component 1804) configuration, also shows that the electronics component 104 may further include a retroreflective component 3002 that advantageously reflects incoming light 3004 from automobile headlamps, for example. Retroreflective component 3002 may be on a portion of second housing 1204 or across the entire radial surface of second housing 1204 without departing from scope hereof.

Figure 32E:
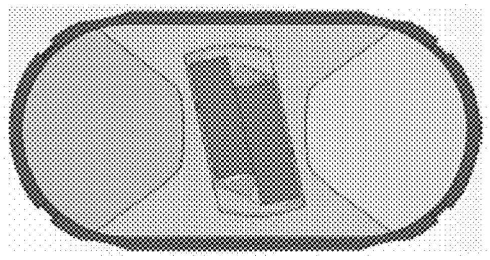
FIG. 32E shows an askew configuration.
Figure 32D:
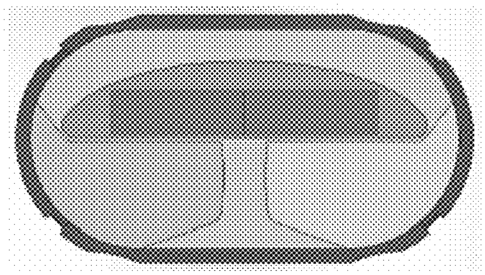
FIG. 32D shows the light-emitting device offset from the longitudinal axis of illuminated roadway device on a first side, and the solar power generation component offset from the longitudinal axis of illuminated roadway device on a second side thereof.
Figure 32C:
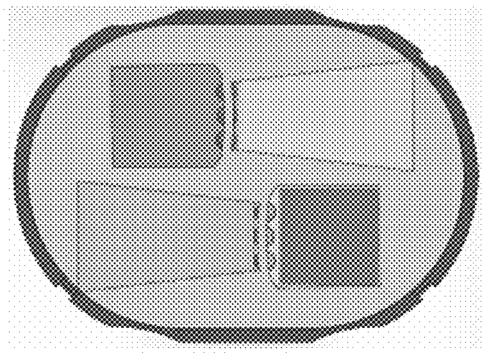
FIG. 32C shows two sets of light-emitting devices in a single illuminated roadway device emitting in different directions and offset from the longitudinal axis of the illuminated roadway device.
Figure 32B:
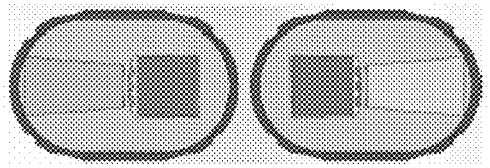
FIG. 32B shows an example of two separate illuminated roadway device each emitting lights in different directions.
Figure 32A:
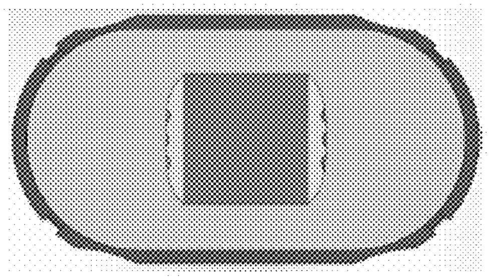
FIG. 32A shows an example where solar-power aperture of impact plate also aligns with the optically transparent window of the electronics component and light emitted from the electronics component passes through solar-power aperture.

FIGS. 32A-E show example configurations of the components of illuminated roadway device 100 discussed above. FIG. 32A shows an example where solar-power aperture 310 of impact plate 106 also aligns with the 1814 and light emitted therefrom passes through solar-power aperture 310. FIG. 32B shows an example of two separate illuminated roadway device 100 each emitting lights in different directions. FIG. 32C shows two sets of light-emitting devices 1808 in a single illuminated roadway device 100 emitting in different directions and offset from the longitudinal axis of the illuminated roadway device 100. FIG. 32C also shows that a given impact plate 106 may cover multiple electronics component 104 located within the same outer shell 102. In other words, a given illuminated roadway device 100 may have a single outer shell 102, multiple electronics component 104, and a single impact plate 106 (which may have sub-sections as discussed above). FIG. 32D shows the light-emitting device 1808 offset from the longitudinal axis of illuminated roadway device 100 on a first side, and the solar power generation component 1804 offset from the longitudinal axis of illuminated roadway device 100 on a second side thereof. FIG. 32E shows an askew configuration.

Figure 34:
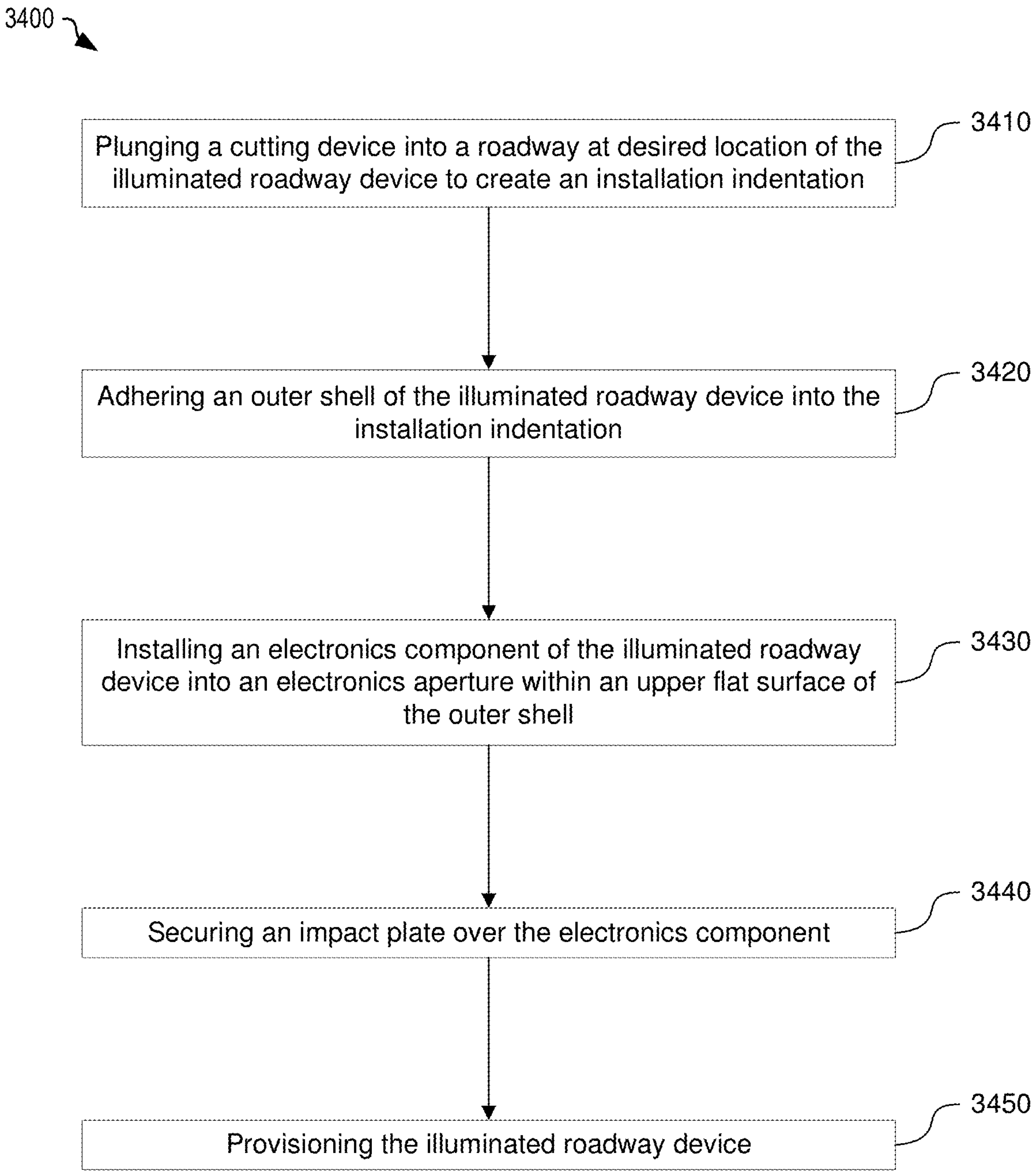
FIG. 34 is a flowchart of an example method for installing an illuminated roadway device.

FIG. 34 is a flowchart of an example method 3400 for installing an illuminated roadway device. Illuminated roadway device 100 is for example used to install any of the embodiments of illuminated roadway device 100 discussed above.

At step 3410, method 3400 includes plunging a cutting device (which may include, but is not limited to, any one or more of saw blades, grinders, endmills, drill bits, and coring bit, or the like as used in roadway maintenance/installation/management) into a roadway at desired location of the illuminated roadway device to create an installation indentation (e.g., installation indentation 802). In one example of step 3410, plunging a cutting device includes dragging the cutting device along a path, the installation indentation corresponding to the path. In such example, a lower surface (e.g., lower curved surface 1002) of the outer shell outer shell 102 includes a flat portion that rests along the flat area of the installation indentation 802. In another example of step 3410, plunging a cutting device includes creating a curved installation indentation with parallel walls alongside. In such embodiment, an entire bottom surface (e.g., lower curved surface 1002) of the outer shell outer shell 102 being curved to correspond to a shape of the installation indentation 802.

At step 3420, method 3400 includes adhering an outer shell of the illuminated roadway device into the installation indentation. In one example of step 3420, outer shell 102 is adhered or otherwise affixed within installation indentation 802. In examples where installation indentation 802 is formed using a "plunge and drag" cut, there may be a plurality of illuminated roadway devices 100 in a given installation indentation 802.

At step 3430, method 3400 includes installing an electronics component or multiple electronics components of the illuminated roadway device into an electronics aperture within an upper flat surface of the outer shell. In one example of step 3430, electronics component 104 is inserted and secured within electronics component aperture 1006.

At step 3440, method 3400 includes securing an impact plate over the electronics component. In one example of operation of step 3440 includes securing impact plate 106 over electronics component 104 such that solar-power aperture 310 is aligned with solar power generation component 1804.

At step 3450, method 3400 includes provisioning the illuminated roadway device. In one example of step 3450, method 3400 includes using one or both of sensor 2606 and wireless communication device 2608 to modify or determine provisioning data/instructions within control logic 2610. In one example of step 3450, provisioning includes interfacing with the electronics component using a magnetic communication device (e.g., wherein electronics component 104 includes sensor 2606 as a magnetic sensor). In one example of step 3450, provisioning includes interfacing with the electronics component using a wireless communication device (e.g., wherein electronics component 104 includes wireless communication device 2608). In one example of step 3450, provisioning includes controlling a first light-emitting device of a plurality of light-emitting devices in the electronics component to emit at a first color and a second light-emitting device of the plurality of light-emitting devices to emit at a second color.

Method 3400 may further include installing additional features discussed above with respects to FIGS. 1-31. For example, method 3400 may include installing an isolating cover (e.g., isolating cover 702) located between the electronics component and the outer shell. In addition, method 3400 may include one or both of leveling or setting installation depth of the illuminated roadway device with respect to the roadway using a removable installation tab (e.g., at least one mounting tab 108), which may, in at least some embodiments, be biodegradable.

Various steps within method 3400 may be completed at different locations other than the mounting/installation location on roadway 800. For example, steps 3430-3450 may be completed at assembly warehouse instead of on-site at the installation location.

Figure 35:
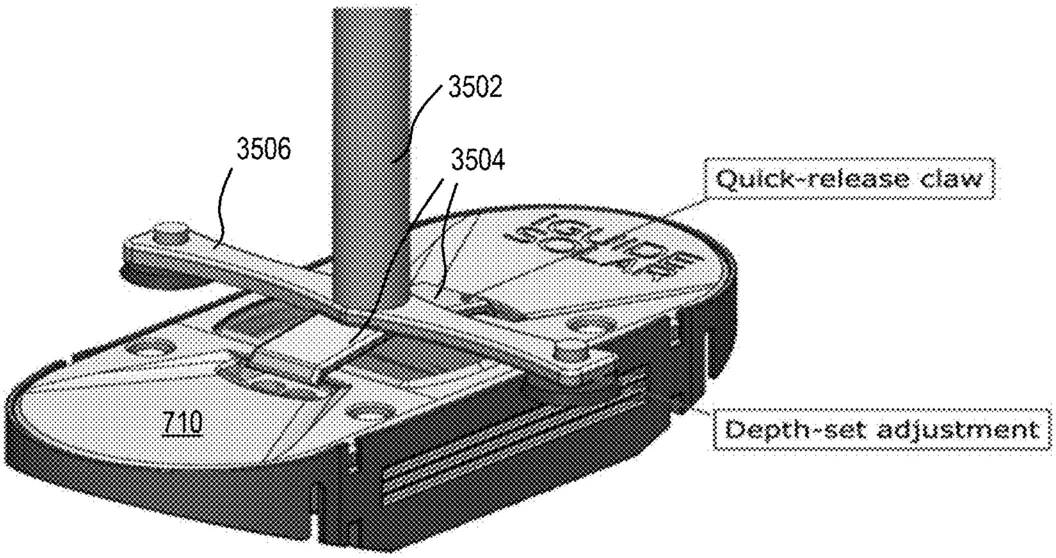
FIGS. 35-37 show mounting devices used to install illuminated roadway device, in embodiments.

Installation according to method 3400 may use one or more additional hardware devices. FIG. 35 shows a mounting device 3500 used to install illuminated roadway device 100, in an embodiment. Mounting device 3500 includes a handle 3502, a clip section 3504, and a depth-set component 3506. Handle 3502 is shown as a rod extending upward and may be 3-4 feet to allow for installation without bending downward. Moreover, handle 3502 may be coupled to an external device, such as an installation vehicle or other hardware used io install illuminated roadway device 100. Clip section 3504 (referred to as quick-release claw) includes a clip that interfaces with the installed impact plate 106. In the example shown in FIG. 35, clip section 3504 clips onto a ridge of impact plate 106 formed at the location of optic ramps 312. Depth-set component 3506 includes extensions from handle 3502 that span beyond the side of illuminated roadway device 100. At the end of these extensions is a pad coupled via a threaded rod to the extension such that the pad may be pushed to the roadway and the threaded rod actuated to set a desired installation depth of illuminated roadway device 100.

Figure 37:
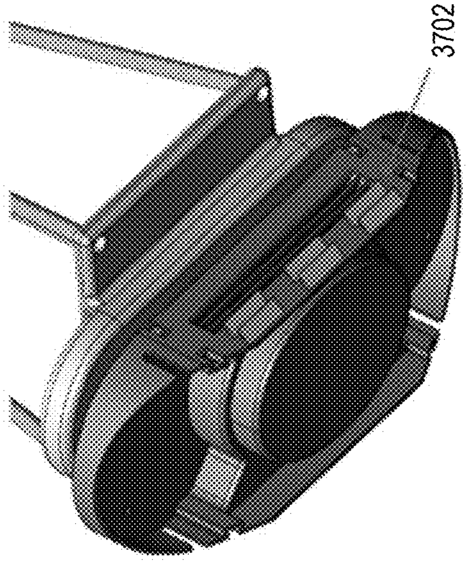
Figure 36:
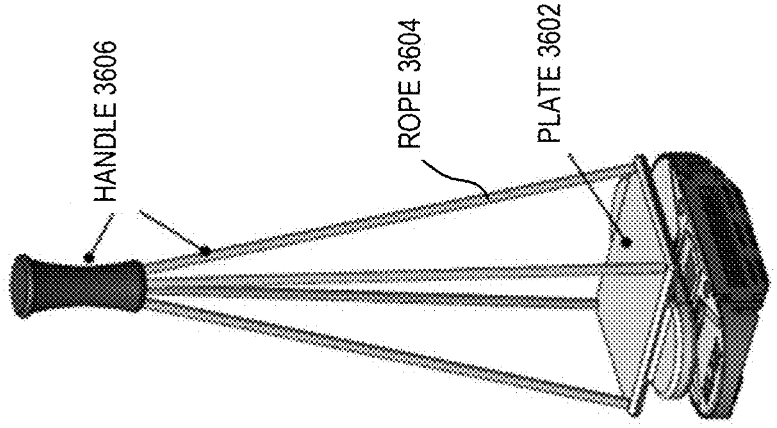

FIGS. 36-37 show another example of a mounting device 3600. Mounting device 3600 includes a plate 3602 coupled to a plurality of ropes 3604 and a handle 3606. Stomp plate 3602 allows the installer to press with the installer's feet against the plate 3602 to set the depth of illuminated roadway device 100 in the roadway. Stomp plate 3602 may be magnetic such that impact plate 106 is magnetically coupled to plate 3602. Ropes 3604 may be rods without departing from scope hereof. FIG. 37 further details additional features that may be included in illuminated roadway device 100 e.g., as a component of electronics component 104. Electronics component electronics component 104 may include snap-fit fins 3702 that interface with outer shell 102 to secure electronic component 104 within outer shell 102.

The following listing of clauses describes example features that may be combined in any manner within the scope of the disclosure herein.

Clause 1. An illuminated roadway device, comprising: an outer shell fixable to a roadway; an electronics component insertable into the outer shell, the electronics component comprising: a housing comprising a first housing, and a second housing securable to the first housing, a power device secured within the electronics component, a solar power generation component in coupled with the power device to recharge the power device, an optic arrangement located at the housing comprising a light collimator in an internal space defined by the housing and in optical communication with a light-emitting surface at an external space of the housing; a light-emitting device aligned with the optic arrangement such that light emitted by the light-emitting device enters the light collimator; and an impact plate secured to the outer shell and covering at least a part of the electronics component.

Clause 2. The outer shell having a curved lower surface and a flat upper surface.

Clause 3. The curved lower surface defined by an array of supports and filler component located between adjacent supports of the array of supports.

Clause 4. The curved lower surface including protrusions to aide in fixating the outer shell to the roadway.

Clause 5. The flat upper surface defining at least one electronics component aperture sized and shaped to receive the electronics component.

Clause 6. The illuminated roadway device of an above clause, further comprising a isolating cover located between the electronics component and the outer shell.

Clause 7. The isolating cover comprising a cover made of a malleable having an upper flange extending over an upper surface of the second housing, and a lower flange extending over a lower surface of the first housing to cover a connection of the second housing to the first housing; wherein when installed, isolating cover provides water resistance and vibration dampening to the electronics component.

Clause 8. The light-emitting surface sized and shaped to emit light having at least a vertical 15-degree or greater spread of light.

Clause 9. The the optic arrangement configured to reduce light emission from the illuminated roadway device at an angle normal to the roadway.

Clause 10. The illuminated roadway device of any above clause, further comprising a radial seal between the second housing and the first housing.

Clause 11. The power device comprising a rechargeable battery.

Clause 12. The power device comprising supercapacitor.

Clause 13. The optical arrangement being integral with the housing.

Clause 14. The housing comprising optically transparent polycarbonate material.

Clause 15. The light-emitting device comprising a plurality of light-emitting devices.

Clause 16. At least one first light-emitting device of the plurality of light-emitting devices comprising a first color, and at least one second light-emitting device of the plurality of light-emitting devices comprising a second color, the optic arrangement configured to emit light of the first color in a first direction and light of the second color in a second direction.

Clause 17. The light collimator comprising a plurality of light collimators each aligned with a subset of the plurality of light-emitting devices.

Clause 18. The light collimator comprising a row collimator aligned with multiple light-emitting devices of the plurality of light-emitting devices.

Clause 19. The emitting surface arranged to emit light across the solar power generation component.

Clause 20. The optic arrangement further comprising a total internal reflection surface between the light collimator and the light-emitting surface.

Clause 21. One or both of the housing or the impact plate further comprising a retroreflective surface.

Clause 22. The optic arrangement further comprising a diffuser surface for emitting a portion of light entering into the light collimator in a diffusion direction different than an emission direction of light exiting the light-emitting surface.

Clause 23. The electronics component further comprising a support sized and shaped to support the power device on an bottom surface and the solar power generator on a upper surface of the support.

Clause 24. The illuminated roadway device of any above clause, having an overall height of less than 2.5 inches.

Clause 25. The electronics component further comprising a controller coupled with one or both of a sensor or a wireless communication device; the illuminated roadway device communicating with an external device external to the illuminated roadway device.

Clause 26. The sensor comprising a magnetic sensor, wherein the controller is provisioned a magnetic device as the external device.

Clause 27. The external device being an automobile.

Clause 28. The electronics component configured to, using the wireless communication device, transmit one or more of status, health information, and/or battery life information to the external device.

Clause 29. The electronics component configured to control modulation of the light-emitting device to indicate battery life or health of the illuminated roadway device.

Clause 30. The illuminated roadway device of any above clause, further comprising a controller configured to determine when to activate or deactivate the light-emitting device, the controller including hysteresis logic to prevent automobile lights from deactivating the light-emitting device.

Clause 31. The impact plate comprising a single plate.

Clause 32. The impact plate comprising a plurality of plate sections.

Clause 33. A middle plate of the plurality of plate sections of the impact plate comprising steel, and an outer plate of the plurality of plate sections comprising a composite plastic material.

Clause 34. The impact plate or housing defining a negatively-sloped optic ramp, from an outer edge of the impact plate towards the light-emitting surface such that the light emitted by the illuminated roadway device is visible when the illuminated roadway device is flush-mounted to the roadway.

Clause 35. The further comprising a mounting tab removably securable to one or both of the impact plate and the outer shell to assist in mounting the illuminated roadway device flush with the roadway.

Clause 36. The mounting tab being biodegradable.

Clause 37. The mounting tab comprising a plurality of protrusions that interface with indentations of the impact plate during installation of the illuminated roadway device.

Clause 38. The electronics component comprising a first electronics component and a second electronics component, the first electronics component emitting light in a first direction, and the second electronics component emitting light in a second direction different from the first direction.

Clause 39. A method for installing an illuminated roadway device, comprising: plunging a cutting device into a roadway at desired location of the illuminated roadway device to create an installation indentation; adhering an outer shell of the illuminated roadway device into the installation indentation; installing an electronics component of the illuminated roadway device into an electronics aperture within an upper flat surface of the outer shell; securing an impact plate over the electronics component; and provisioning the illuminated roadway device.

Clause 40. The method of clause 39, an entire bottom surface of the outer shell being curved to correspond to a shape of the installation indentation.

Clause 41. The method of any of clauses 39-40, installing the electronics component including installing an isolating cover located between the electronics component and the outer shell.

Clause 42. The method of any of clauses 39-41, the provisioning including interfacing with the electronics component using a magnetic communication device.

Clause 43. The method of any of clauses 39-42, the provisioning including interfacing with the electronics component using a wireless communication device.

Clause 44. The method of any of clauses 39-43, the provisioning including controlling a first light-emitting device of a plurality of light-emitting devices in the electronics component to emit at a first color and a second light-emitting device of the plurality of light-emitting devices to emit at a second color.

Clause 45. The method of any of clauses 39-44, further comprising one or both of leveling or setting installation depth of the illuminated roadway device with respect to the roadway using a removable installation tab.

Clause 46. The method of clause 45, the removable installation tab being biodegradable.

Clause 47. A wireless roadway communication device, comprising: an electronics component mountable within a roadway and comprising: a memory storing non-transitory computer readable instructions, and a processor that, in response to executing the computer readable instructions, causes the electronics component to: receive, via a wireless control signal, provisioning data for configuring the electronics component, and output, using a light-emitting device, light according to the provisioning data.

Clause 48. The wireless roadway communication device of clause 47, further comprising a magnetic sensor; the wireless control signal being a magnetic control signal that interfaces with the magnetic sensor.

Clause 49. The wireless roadway communication device of any of clauses 47-48, further comprising a radio frequency (RF)-based wireless communication device, the wireless control signal being an RF control signal that interfaces with the (RF)-based wireless communication device.

Clause 50. The wireless roadway communication device of any of clauses 47-49, further comprising outputting a wireless communication signal using the RF-based wireless communication device to communicate with an oncoming vehicle.

Clause 51. The wireless roadway communication device of any of clauses 47-50, further comprising a light sensor, the wireless control signal being a light control signal that interfaces with the light sensor.

Clause 52. The wireless roadway communication device of any of clauses 47-51, the processor, in response to the computer readable instructions, further causing the electronics component to: detect ambient light; and control activation of a light-emitting device based on level of the ambient light.

Clause 53. The wireless roadway communication device of clause 52, the processor, in response to the computer readable instructions, further causing the electronics component to one or both of: deactivate light-emitting device when the ambient light level is above a threshold for a predetermined amount of time, or activate the light-emitting device when the ambient level is at or below the threshold for a predetermined amount of time.

Clause 54. The wireless roadway communication device of any of clauses 47-53, the output light according to the provisioning data including outputting a pattern of light to communicate with an approaching vehicle.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An illuminated roadway device, comprising:

an outer shell fixable to a roadway;

an electronics component insertable into the outer shell, the electronics component comprising:

a housing comprising a first housing, and a second housing securable to the first housing, a power device secured within the electronics component, a solar power generation component in coupled with the power device to recharge the power device, an optic arrangement located at the housing;

a light-emitting device aligned with the optic arrangement; and an impact plate secured to the outer shell and covering at least a part of the electronics component; and an isolating cover located between the electronics component and the outer shell.

2. The illuminated roadway device of claim 1, the outer shell having a curved lower surface and a flat upper surface.

3. The illuminated roadway device of claim 1, the optical arrangement comprising a light collimator in an internal space defined by the housing and in optical communication with a light-emitting surface at an external space of the housing.

4. The illuminated roadway device of claim 1, the isolating cover comprising a cover made of a malleable material and having an upper flange extending over an upper surface of the second housing, and a lower flange extending over a lower surface of the first housing to cover a connection of the second housing to the first housing; wherein when installed, isolating cover provides water resistance and vibration dampening to the electronics component.

5. The illuminated roadway device of claim 1, the optic arrangement configured to emit 80 or more percent of maximum intensity of light between zero and 20 degrees from horizontal to the roadway.

6. The illuminated roadway device of claim 1, the optic arrangement configured to reduce light emission from the illuminated roadway device at an angle greater than 45 degrees to the roadway.

7. The illuminated roadway device of claim 1, the light-emitting device comprising a plurality of light-emitting devices, at least one first light-emitting device of the plurality of light-emitting devices comprising a first color, and at least one second light-emitting device of the plurality of light-emitting devices comprising a second color, the optic arrangement configured to emit light of the first color in a first direction and light of the second color in a second direction.

8. The illuminated roadway device of claim 3, the light-emitting surface arranged to emit light across the solar power generation component.

9. The illuminated roadway device of claim 1, one or both of the housing or the impact plate further comprising a retroreflective surface.

10. The illuminated roadway device of claim 3, the optic arrangement further comprising a diffuser surface for emitting a portion of light entering into the light collimator in a diffusion direction different than an emission direction of light exiting the light-emitting surface.

11. The illuminated roadway device of claim 1, the electronics component further comprising a controller coupled with one or both of a sensor or a wireless communication device; the illuminated roadway device communicating with an external device external to the illuminated roadway device.

12. The illuminated roadway device of claim 11, the sensor comprising a magnetic sensor, wherein the controller is provisioned a magnetic device as the external device.

13. The illuminated roadway device of claim 11, the external device being a road user.

14. The illuminated roadway device of claim 11, the electronics component configured to, using the wireless communication device, transmit one or more of status, health information, and/or battery life information to the external device.

15. The illuminated roadway device of claim 11, the electronics component configured to control modulation of the light-emitting device to indicate battery life or health of the illuminated roadway device.

16. The illuminated roadway device of claim 1, further comprising a controller configured to determine when to activate or deactivate the light-emitting device, the controller including hysteresis logic to prevent automobile lights from deactivating the light-emitting device.

17. The illuminated roadway device of claim 1, the impact plate comprising a plurality of plate sections.

18. The illuminated roadway device of claim 17, a middle plate of the plurality of plate sections comprising steel, and an outer plate of the plurality of plate sections comprising a composite or plastic material.

19. The illuminated roadway device of claim 3, the impact plate or housing defining a negatively-sloped optic ramp, from an outer edge of the impact plate towards the light-emitting surface such that the light emitted by the illuminated roadway device is visible when the illuminated roadway device is flush-mounted to the roadway.

20. The illuminated roadway device of claim 1, further comprising a biodegradable mounting tab removably securable to one or both of the impact plate and the outer shell to assist in leveling or setting installation depth of the illuminated roadway device with respect to the roadway.

21. An illuminated roadway device, comprising:

an outer shell fixable to a roadway;

an electronics component insertable into the outer shell, the electronics component comprising:

a housing comprising a first housing, and a second housing securable to the first housing, a power device secured within the electronics component, a solar power generation component in coupled with the power device to recharge the power device, an optic arrangement located at the housing comprising a light collimator in an internal space defined by the housing and in optical communication with a light-emitting surface at an external space of the housing, the optic arrangement configured to emit 80 or more percent of maximum intensity of light between zero and 20 degrees from horizontal to the roadway;

a light-emitting device aligned with the optic arrangement such that light emitted by the light-emitting device enters the light collimator; and an impact plate secured to the outer shell and covering at least a part of the electronics component.

22. An illuminated roadway device, comprising:

an outer shell fixable to a roadway;

an electronics component insertable into the outer shell, the electronics component comprising:

a housing comprising a first housing, and a second housing securable to the first housing, a power device secured within the electronics component, a solar power generation component in coupled with the power device to recharge the power device, an optic arrangement located at the housing comprising a light collimator in an internal space defined by the housing and in optical communication with a light-emitting surface at an external space of the housing, the optic arrangement configured to reduce light emission from the illuminated roadway device at an angle greater than 45 degrees to the roadway;

a light-emitting device aligned with the optic arrangement such that light emitted by the light-emitting device enters the light collimator; and an impact plate secured to the outer shell and covering at least a part of the electronics component.

23. An illuminated roadway device, comprising:

an outer shell fixable to a roadway;

an electronics component insertable into the outer shell, the electronics component comprising:

a housing comprising a first housing, and a second housing securable to the first housing, a power device secured within the electronics component, a solar power generation component in coupled with the power device to recharge the power device, an optic arrangement located at the housing comprising:

a light collimator in an internal space defined by the housing and in optical communication with a light-emitting surface at an external space of the housing, and a diffuser surface for emitting a portion of light entering into the light collimator in a diffusion direction different than an emission direction of light exiting the light-emitting surface;

a light-emitting device aligned with the optic arrangement such that light emitted by the light-emitting device enters the light collimator; and an impact plate secured to the outer shell and covering at least a part of the electronics component.

24. The illuminated roadway device of claim 23, the outer shell having a curved lower surface and a flat upper surface.

25. The illuminated roadway device of claim 23, further comprising an isolating cover located between the electronics component and the outer shell.

26. The illuminated roadway device of claim 25, the isolating cover comprising a cover made of a malleable material and having an upper flange extending over an upper surface of the second housing, and a lower flange extending over a lower surface of the first housing to cover a connection of the second housing to the first housing; wherein when installed, isolating cover provides water resistance and vibration dampening to the electronics component.

27. The illuminated roadway device of claim 23, the optic arrangement configured to emit 80 or more percent of maximum intensity of light between zero and 20 degrees from horizontal to the roadway.

28. The illuminated roadway device of claim 23, the optic arrangement configured to reduce light emission from the illuminated roadway device at an angle greater than 45 degrees to the roadway.

29. The illuminated roadway device of claim 23, the light-emitting device comprising a plurality of light-emitting devices, at least one first light-emitting device of the plurality of light-emitting devices comprising a first color, and at least one second light-emitting device of the plurality of light-emitting devices comprising a second color, the optic arrangement configured to emit light of the first color in a first direction and light of the second color in a second direction.

30. The illuminated roadway device of claim 23, the emitting surface arranged to emit light across the solar power generation component.

31. The illuminated roadway device of claim 23, one or both of the housing or the impact plate further comprising a retroreflective surface.

32. The illuminated roadway device of claim 23, the electronics component further comprising a controller coupled with one or both of a sensor or a wireless communication device; the illuminated roadway device communicating with an external device external to the illuminated roadway device.

33. The illuminated roadway device of claim 32, the sensor comprising a magnetic sensor, wherein the controller is provisioned a magnetic device as the external device.

34. The illuminated roadway device of claim 32, the external device being a road user.

35. The illuminated roadway device of claim 32, the electronics component configured to, using the wireless communication device, transmit one or more of status, health information, and/or battery life information to the external device.

36. The illuminated roadway device of claim 32, the electronics component configured to control modulation of the light-emitting device to indicate battery life or health of the illuminated roadway device.

37. The illuminated roadway device of claim 23, further comprising a controller configured to determine when to activate or deactivate the light-emitting device, the controller including hysteresis logic to prevent automobile lights from deactivating the light-emitting device.

38. The illuminated roadway device of claim 23, the impact plate comprising a plurality of plate sections.

39. The illuminated roadway device of claim 38, a middle plate of the plurality of plate sections comprising steel, and an outer plate of the plurality of plate sections comprising a composite or plastic material.

40. The illuminated roadway device of claim 23, the impact plate or housing defining a negatively-sloped optic ramp, from an outer edge of the impact plate towards the light-emitting surface such that the light emitted by the illuminated roadway device is visible when the illuminated roadway device is flush-mounted to the roadway.

41. The illuminated roadway device of claim 23, further comprising a biodegradable mounting tab removably securable to one or both of the impact plate and the outer shell to assist in leveling or setting installation depth of the illuminated roadway device with respect to the roadway.

42. An illuminated roadway device, comprising:

an outer shell fixable to a roadway;

an electronics component insertable into the outer shell, the electronics component comprising:

a housing comprising a first housing, and a second housing securable to the first housing, a power device secured within the electronics component, a solar power generation component in coupled with the power device to recharge the power device, an optic arrangement located at the housing comprising a light collimator in an internal space defined by the housing and in optical communication with a light-emitting surface at an external space of the housing;

a light-emitting device aligned with the optic arrangement such that light emitted by the light-emitting device enters the light collimator; and an impact plate secured to the outer shell and covering at least a part of the electronics component, the impact plate comprising a plurality of plate sections.

43. The illuminated roadway device of claim 42, the outer shell having a curved lower surface and a flat upper surface.

44. The illuminated roadway device of claim 42, further comprising an isolating cover located between the electronics component and the outer shell.

45. The illuminated roadway device of claim 44, the isolating cover comprising a cover made of a malleable material and having an upper flange extending over an upper surface of the second housing, and a lower flange extending over a lower surface of the first housing to cover a connection of the second housing to the first housing; wherein when installed, isolating cover provides water resistance and vibration dampening to the electronics component.

46. The illuminated roadway device of claim 42, the optic arrangement configured to emit 80 or more percent of maximum intensity of light between zero and 20 degrees from horizontal to the roadway.

47. The illuminated roadway device of claim 42, the optic arrangement configured to reduce light emission from the illuminated roadway device at an angle greater than 45 degrees to the roadway.

48. The illuminated roadway device of claim 42, the light-emitting device comprising a plurality of light-emitting devices, at least one first light-emitting device of the plurality of light-emitting devices comprising a first color, and at least one second light-emitting device of the plurality of light-emitting devices comprising a second color, the optic arrangement configured to emit light of the first color in a first direction and light of the second color in a second direction.

49. The illuminated roadway device of claim 42, the emitting surface arranged to emit light across the solar power generation component.

50. The illuminated roadway device of claim 42, one or both of the housing or the impact plate further comprising a retroreflective surface.

51. The illuminated roadway device of claim 42, the optic arrangement further comprising a diffuser surface for emitting a portion of light entering into the light collimator in a diffusion direction different than an emission direction of light exiting the light-emitting surface.

52. The illuminated roadway device of claim 42, the electronics component further comprising a controller coupled with one or both of a sensor or a wireless communication device; the illuminated roadway device communicating with an external device external to the illuminated roadway device.

53. The illuminated roadway device of claim 52, the sensor comprising a magnetic sensor, wherein the controller is provisioned a magnetic device as the external device.

54. The illuminated roadway device of claim 52, the external device being a road user.

55. The illuminated roadway device of claim 52, the electronics component configured to, using the wireless communication device, transmit one or more of status, health information, and/or battery life information to the external device.

56. The illuminated roadway device of claim 52, the electronics component configured to control modulation of the light-emitting device to indicate battery life or health of the illuminated roadway device.

57. The illuminated roadway device of claim 42, further comprising a controller configured to determine when to activate or deactivate the light-emitting device, the controller including hysteresis logic to prevent automobile lights from deactivating the light-emitting device.

58. The illuminated roadway device of claim 42, a middle plate of the plurality of plate sections comprising steel, and an outer plate of the plurality of plate sections comprising a composite or plastic material.

59. The illuminated roadway device of claim 42, the impact plate or housing defining a negatively-sloped optic ramp, from an outer edge of the impact plate towards the light-emitting surface such that the light emitted by the illuminated roadway device is visible when the illuminated roadway device is flush-mounted to the roadway.

60. The illuminated roadway device of claim 42, further comprising a biodegradable mounting tab removably securable to one or both of the impact plate and the outer shell to assist in leveling or setting installation depth of the illuminated roadway device with respect to the roadway.

* * * * *